(12) United States Patent
Okamoto

(10) Patent No.: US 10,220,570 B2
(45) Date of Patent: Mar. 5, 2019

(54) METHOD FOR MANUFACTURING THREE-DIMENSIONAL STRUCTURE, THREE-DIMENSIONAL STRUCTURE MANUFACTURING APPARATUS, INK SET, AND THREE-DIMENSIONAL STRUCTURE

(71) Applicant: SEIKO EPSON CORPORATION, Tokyo (JP)

(72) Inventor: Eiji Okamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 299 days.

(21) Appl. No.: 15/111,784

(22) PCT Filed: Jan. 14, 2015

(86) PCT No.: PCT/JP2015/000142
§ 371 (c)(1),
(2) Date: Jul. 14, 2016

(87) PCT Pub. No.: WO2015/107890
PCT Pub. Date: Jul. 23, 2015

(65) Prior Publication Data
US 2016/0355694 A1    Dec. 8, 2016

(30) Foreign Application Priority Data

Jan. 15, 2014 (JP) ................................ 2014-005447

(51) Int. Cl.
*B29C 64/40* (2017.01)
*B33Y 80/00* (2015.01)
(Continued)

(52) U.S. Cl.
CPC ............ *B29C 64/40* (2017.08); *B29C 64/112* (2017.08); *B29C 64/129* (2017.08); *B33Y 10/00* (2014.12);
(Continued)

(58) Field of Classification Search
CPC ..................................................... B29C 64/40
See application file for complete search history.

(56) References Cited

U.S. PATENT DOCUMENTS 3,732,107 A    5/1973  Faust et al.
3,857,885 A    12/1974 Faust
(Continued)

FOREIGN PATENT DOCUMENTS

JP    46-027926    8/1971
JP    48-041708    12/1973
(Continued)

OTHER PUBLICATIONS

ISR dated Apr. 21, 2015 for PCT/JP2015/000142.

*Primary Examiner* — Timothy Kennedy
(74) *Attorney, Agent, or Firm* — Workman Nydegger

(57) ABSTRACT

In the method for manufacturing a three-dimensional structure of the invention, an ink for forming an entity portion is applied to a region where the three-dimensional structure is configured, and an ink for forming a sacrificial layer is applied to a region on a surface side of an outermost layer which is adjacent to a region to become the outermost. As the ink for forming a sacrificial layer, a first ink for forming a sacrificial layer and a second ink for forming a sacrificial layer are used. At the time of curing the ink for forming an entity portion, the viscoelasticity of the first ink is smaller than that of the ink for forming an entity portion, and at the time of curing the ink for forming an entity portion, the viscoelasticity of the second ink is greater than that of the ink for forming an entity portion.

12 Claims, 4 Drawing Sheets

(51) Int. Cl.
  *B33Y 70/00*    (2015.01)
  *B33Y 10/00*    (2015.01)
  *B33Y 30/00*    (2015.01)
  *C09D 5/00*     (2006.01)
  *C09D 11/107*   (2014.01)
  *B29C 64/112*   (2017.01)
  *B29C 64/129*   (2017.01)
  *B29K 105/00*   (2006.01)

(52) U.S. Cl.
  CPC ............... *B33Y 30/00* (2014.12); *B33Y 70/00* (2014.12); *B33Y 80/00* (2014.12); *C09D 5/008* (2013.01); *C09D 11/107* (2013.01); *B29K 2105/0032* (2013.01); *B29K 2995/0022* (2013.01); *B29K 2995/0024* (2013.01)

(56) References Cited

U.S. PATENT DOCUMENTS

| | | |
|---|---|---|
| 4,458,006 A | 7/1984 | Döenges et al. |
| 4,495,271 A | 1/1985 | Geissler et al. |
| 4,530,747 A | 7/1985 | Döenges et al. |
| 4,987,053 A | 1/1991 | Gersdorf et al. |
| 5,200,299 A | 4/1993 | Steppan et al. |
| 5,594,652 A * | 1/1997 | Penn ................ B29C 64/40 345/419 |
| 6,612,824 B2 | 9/2003 | Tochimoto et al. |
| 6,799,959 B1 | 10/2004 | Tochimoto et al. |
| 9,463,614 B2 * | 10/2016 | Okamoto ........... B29C 64/40 |
| 9,481,162 B2 * | 11/2016 | Okamoto ........... B29C 64/40 |
| 2003/0083771 A1* | 5/2003 | Schmidt ............. B29C 64/40 700/119 |
| 2013/0234370 A1 | 9/2013 | Suzuki et al. |
| 2015/0352783 A1* | 12/2015 | Snyder .............. B29C 64/106 264/132 |

FOREIGN PATENT DOCUMENTS

| | | |
|---|---|---|
| JP | 51-047334 | 12/1976 |
| JP | 54-021726 | 8/1979 |
| JP | 57-196231 | 12/1982 |
| JP | 59-005240 | 1/1984 |
| JP | 59-005241 | 1/1984 |
| JP | 01-165613 | 6/1989 |
| JP | 02-226149 | 9/1990 |
| JP | 2000-280354 | 10/2000 |
| JP | 2001-150556 | 6/2001 |
| JP | 2011-073163 | 4/2011 |
| JP | 2012-111226 | 6/2012 |
| JP | 2013067117 A | 4/2013 |

* cited by examiner

[Fig. 1A]
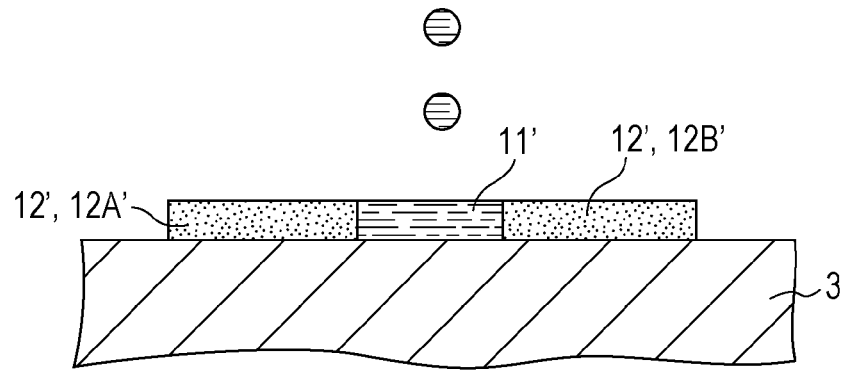
[Fig. 1B]
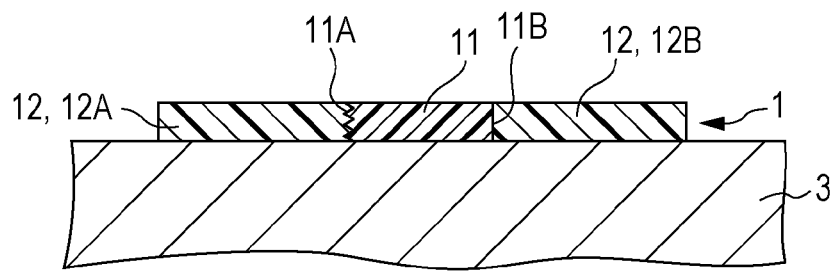
[Fig. 1C]
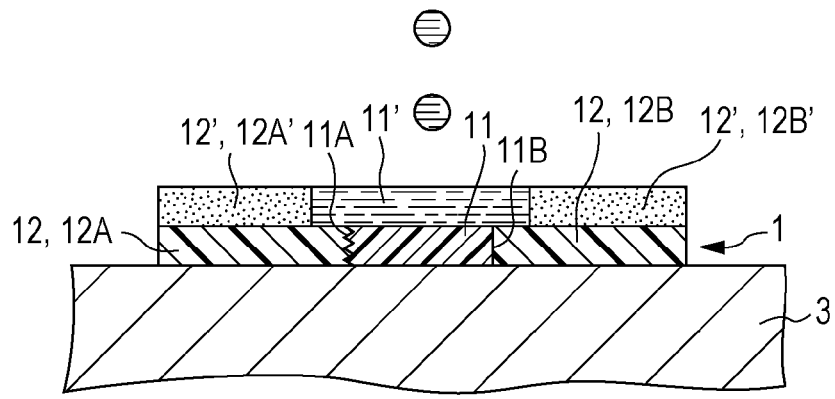
[Fig. 1D]
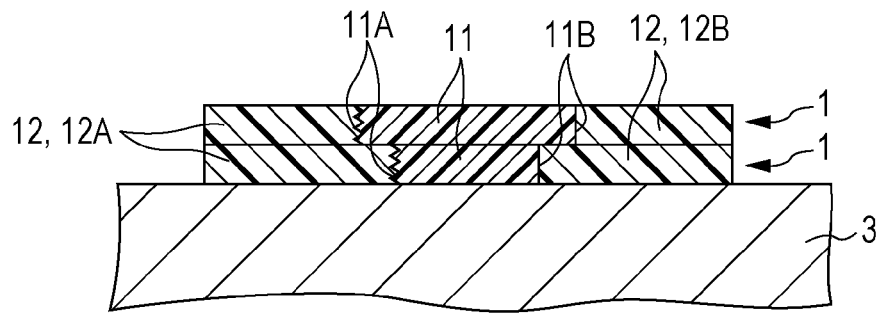

[Fig. 2E]
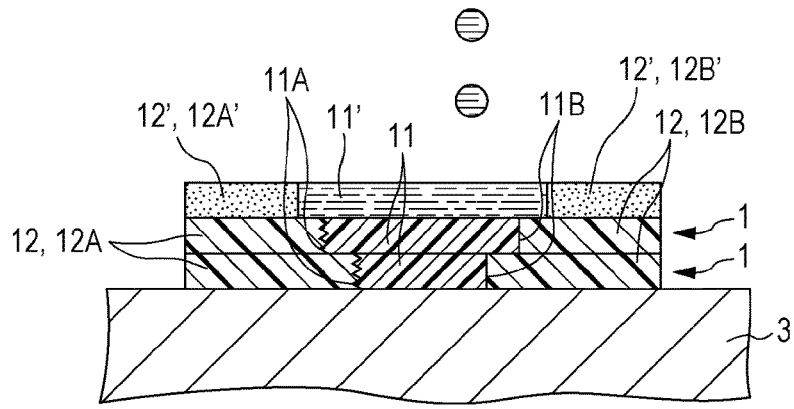
[Fig. 2F]
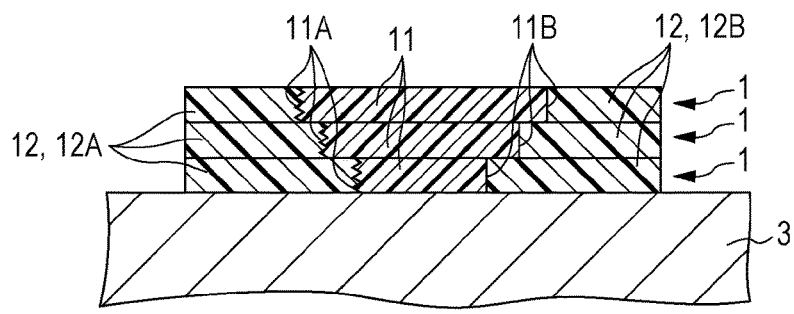
[Fig. 2G]
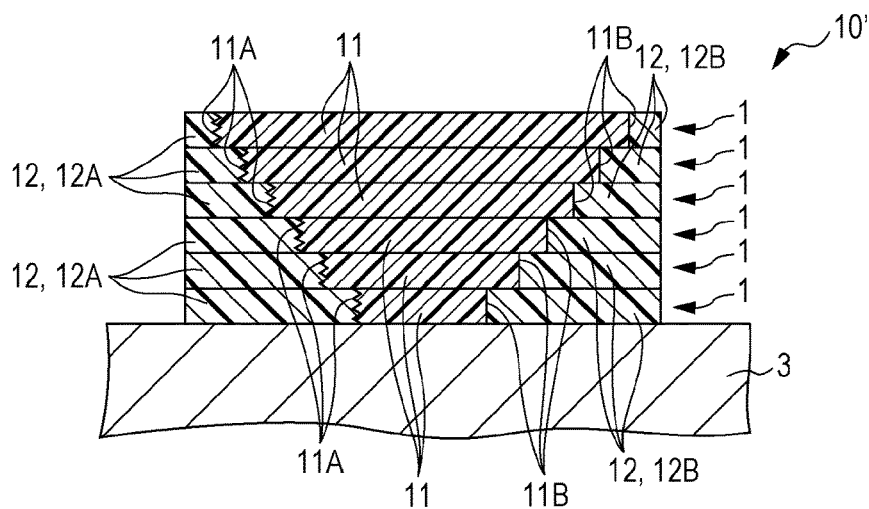
[Fig. 2H]
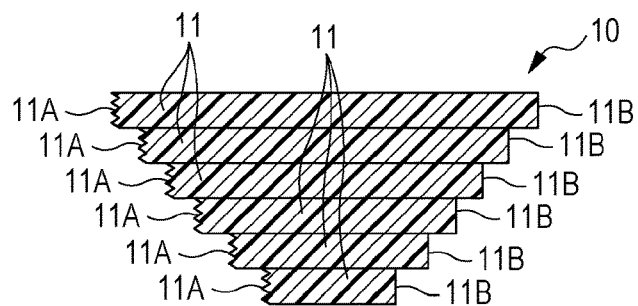

[Fig. 3]
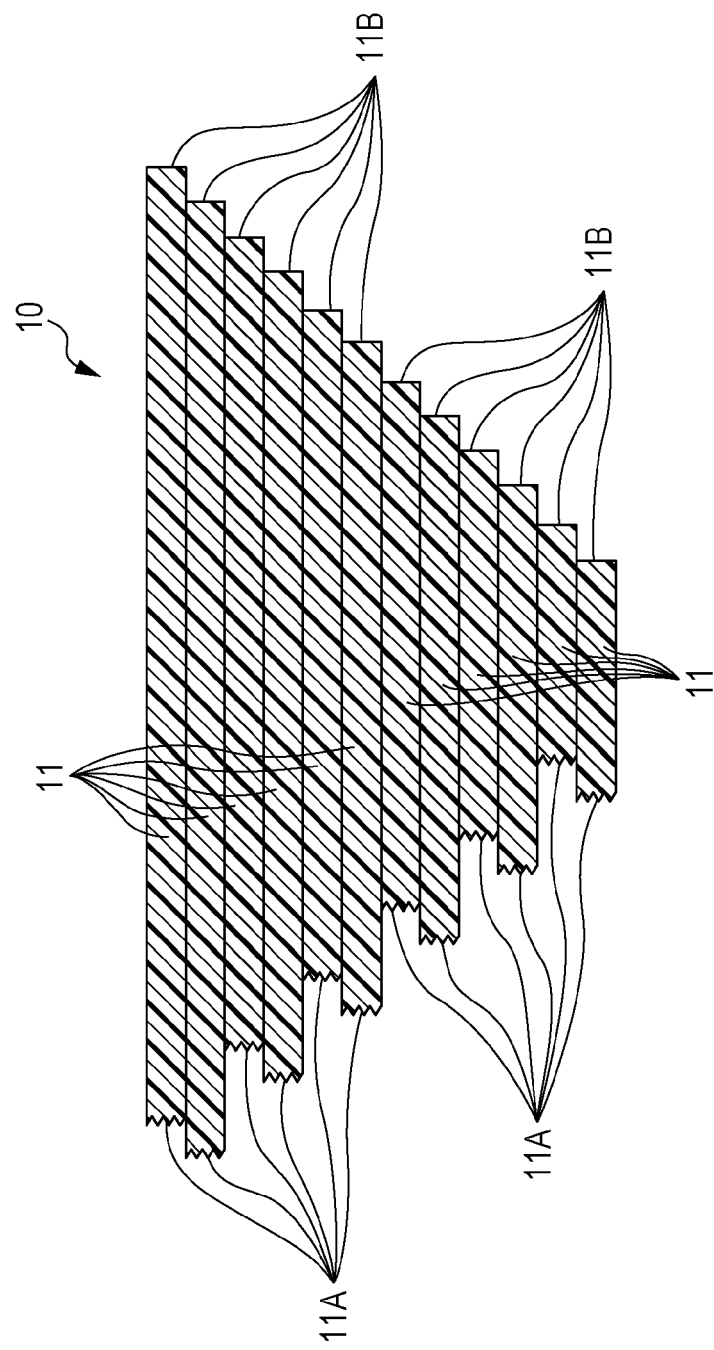

[Fig. 4]
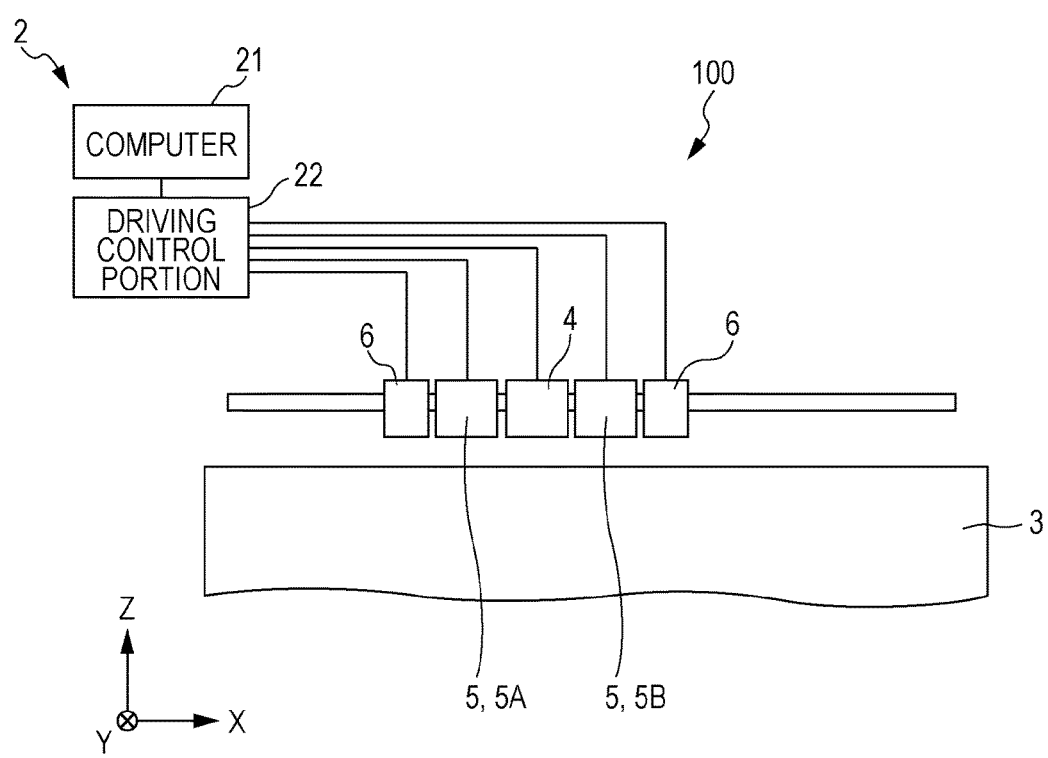

METHOD FOR MANUFACTURING THREE-DIMENSIONAL STRUCTURE, THREE-DIMENSIONAL STRUCTURE MANUFACTURING APPARATUS, INK SET, AND THREE-DIMENSIONAL STRUCTURE

The entire disclosure of Japanese Patent Application No. 2014-005447, filed Jan. 15, 2014 is expressly incorporated by reference herein.

TECHNICAL FIELD

The present invention relates to a method for manufacturing a three-dimensional structure, a three-dimensional structure manufacturing apparatus, an ink set, and a three-dimensional structure.

BACKGROUND ART

In the related art, a method for forming a three-dimensional structure is known based on a model of a three-dimensional object, for example, generated by three-dimensional CAD software or the like.

As one method for forming a three-dimensional structure, a stacking method is known. In the stacking method, in general, after splitting the model of a three-dimensional object into a large number of two-dimensional cross-sectional layers, a three-dimensional structure is formed by sequentially stacking a cross-section member while sequentially forming the cross-section member corresponding to each two-dimensional cross-sectional layer.

By the stacking method, a three-dimensional structure can be formed immediately as long as there is a model of a three-dimensional structure to be formed, and since there is no need to make a die before forming, it is possible to quickly and inexpensively form a three-dimensional structure. In addition, since a three-dimensional structure is formed by stacking a cross-section member having a thin plate-shape one layer by one layer, for example, even in a case where the object has a complex internal structure, it is possible to form an integrally formed object without being divided into a plurality of parts.

As one such stacking method, a technology for forming a three-dimensional structure while hardening a powder with a binding liquid is known (for example, refer to PTL 1). In this technique, when each layer is formed, by discharging an ink containing a colorant to the location corresponding to the outer surface side of a three-dimensional structure, the three-dimensional structure is colored.

However, in the methods in the related art, it is difficult to reliably control the surface condition of the three-dimensional structure, and for example, it is substantially impossible to selectively use an appearance of a matte tone and an appearance of a gloss tone at a desired portion.

CITATION LIST

Patent Literature

PTL 1: JP-A-2001-150556

SUMMARY OF INVENTION

Technical Problem

An object of the invention is to provide a method for manufacturing a three-dimensional structure in which a three-dimensional structure in which a region having an appearance of a matte tone and a region having an appearance of a gloss tone are provided at a desired portion is stably and efficiently manufactured, a three-dimensional structure manufacturing apparatus which can manufacture a three-dimensional structure in which a region having an appearance of the matte tone and a region having an appearance of the gloss tone are provided at a desired portion stably and efficiently, an ink set which is capable of being used for stably and efficiently manufacturing a three-dimensional structure in which a region having an appearance of the matte tone and a region having an appearance of the gloss tone are provided at a desired portion, and a three-dimensional structure in which a region having an appearance of the matte tone and a region having an appearance of the gloss tone are provided at a desired portion.

Solution to Problem

Such an object is achieved using the invention described below.

According to a first aspect of the invention, there is provided a method for manufacturing a three-dimensional structure by stacking layers formed by discharging an ink including a curable resin and curing the layers, in which an ink for forming an entity portion is applied to a region where the three-dimensional structure is configured, and an ink for forming a sacrificial layer for forming a sacrificial layer is applied to a region on a surface side of an outermost layer which is adjacent to a region to become the outermost layer of the three-dimensional structure, a first ink for forming a sacrificial layer and a second ink for forming a sacrificial layer are used as the ink for forming a sacrificial layer, the viscoelasticity of the first ink for forming a sacrificial layer at the time of curing the ink for forming an entity portion is smaller than the viscoelasticity of the ink for forming an entity portion at the time of curing the ink for forming an entity portion, and the viscoelasticity of the second ink for forming a sacrificial layer at the time of curing the ink for forming an entity portion is greater than the viscoelasticity of the ink for forming an entity portion at the time of curing the ink for forming an entity portion.

Thereby, it is possible to provide a method for manufacturing a three-dimensional structure in which a three-dimensional structure in which a region having an appearance of a matte tone and a region having an appearance of a gloss tone are provided at a desired portion is stably and efficiently manufactured.

The method for manufacturing a three-dimensional structure of the invention preferably includes a step of removing the sacrificial layer from a temporarily formed body obtained by curing the ink for forming an entity portion, the first ink for forming a sacrificial layer, and the second ink for forming a sacrificial layer.

Thereby, since in the finally obtained three-dimensional structure, the entity portion is exposed, the observer can observe the surface state of the region having an appearance of a matte tone and the region having an appearance of a gloss tone more suitably. Therefore, effects of the invention are more significantly exhibited.

In the method for manufacturing a three-dimensional structure of the invention, the first ink for forming a sacrificial layer preferably includes one type or two or more types selected from the group consisting of tetrahydrofurfuryl (meth)acrylate, ethoxyethoxyethyl (meth)acrylate, polyethylene glycol di(meth)acrylate, and (meth)acryloyl morpholine.

Thereby, it is possible to cure the first ink for forming a sacrificial layer at a more suitable curing rate, it is possible to more reliably form a region exhibiting an appearance of a matte tone in a three-dimensional structure, and it is possible to make productivity of a three-dimensional structure excellent.

In the method for manufacturing a three-dimensional structure of the invention, the second ink for forming a sacrificial layer preferably includes 2-(2-vinyloxyethoxy) ethyl (meth)acrylate.

Thereby, it is possible to cure the second ink for forming a sacrificial layer at a more suitable curing rate, it is possible to more reliably form a region exhibiting an appearance of a gloss tone in a three-dimensional structure, and it is possible to make productivity of a three-dimensional structure excellent.

In the method for manufacturing a three-dimensional structure of the invention, the second ink for forming a sacrificial layer preferably includes polyethylene glycol di(meth)acrylate in addition to 2-(2-vinyloxyethoxy)ethyl (meth)acrylate.

Thereby, it is possible to cure the second ink for forming a sacrificial layer at a further suitable curing rate, it is possible to further reliably form a region exhibiting an appearance of a gloss tone in a three-dimensional structure, and it is possible to make productivity of a three-dimensional structure excellent.

In the method for manufacturing a three-dimensional structure of the invention, the ink for forming an entity portion preferably includes one type or two or more types selected from the group consisting of 2-(2-vinyloxyethoxy) ethyl (meth)acrylate, polyether-based aliphatic urethane (meth)acrylate oligomer, 2-hydroxy-3-phenoxypropyl (meth)acrylate, and 4-hydroxybutyl (meth)acrylate.

Thereby, it is possible to cure the ink for forming an entity portion at a more suitable curing rate, it is possible to more suitably control the surface shape of a three-dimensional structure, it is possible to more reliably obtain an appearance of a matte tone and an appearance of a gloss tone in a three-dimensional structure, and it is possible to make productivity of a three-dimensional structure excellent.

In the method for manufacturing a three-dimensional structure of the invention, all of the ink for forming an entity portion, the first ink for forming a sacrificial layer, and the second ink for forming a sacrificial layer preferably include a polymerization initiator, and the content of the polymerization initiator in the ink for forming an entity portion is preferably greater than the content of the polymerization initiator in the first ink for forming a sacrificial layer and the content of the polymerization initiator in the second ink for forming a sacrificial layer.

Thereby, it is possible to respectively cure the ink for forming an entity portion and the inks for forming a sacrificial layer (the first ink for forming a sacrificial layer and the second ink for forming a sacrificial layer) at a more suitable curing rate, it is possible to more suitably control the surface shape of a three-dimensional structure, and it is possible to more reliably obtain an appearance of a matte tone and an appearance of a gloss tone in a three-dimensional structure.

In the method for manufacturing a three-dimensional structure of the invention, all of the ink for forming an entity portion, the first ink for forming a sacrificial layer, and the second ink for forming a sacrificial layer preferably include bis(2,4,6-trimethylbenzoyl)-phenylphosphine oxide, and/or 2,4,6-trimethylbenzoyl-diphenyl-phosphine oxide as a polymerization initiator.

Thereby, it is possible to cure the ink for forming an entity portion and the inks for forming a sacrificial layer (the first ink for forming a sacrificial layer and the second ink for forming a sacrificial layer) at a more suitable curing rate, it is possible to more suitably control the surface shape of a three-dimensional structure, it is possible to more reliably form a region exhibiting an appearance of a matte tone and a region exhibiting an appearance of a gloss tone in a three-dimensional structure, and it is possible to make productivity of a three-dimensional structure excellent.

In the method for manufacturing a three-dimensional structure of the invention, as the ink for forming an entity portion, in addition to a coloring ink containing a colorant, a colorless ink not containing a coloring agent is preferably used, the colorless ink is preferably used for forming a region to become the outermost layer, and the coloring ink is preferably used for forming a region on the inner side than that region.

Thereby, it is possible to more suitably control the surface shape of a three-dimensional structure, and it is possible to more suitably represent a texture of a matte tone and a texture of a gloss tone. In addition, though the entity portion containing a colorant (in particular, a pigment) is likely to be brittle, scratched, or chipped compared to the entity portion not containing a colorant, by providing a region (a coating layer) formed by using the ink for forming an entity portion not containing a colorant, it is possible to effectively prevent an occurrence of such problems.

In addition, even in a case where the surface is worn by using a three-dimensional structure for a long period of time, it is possible to effectively prevent and suppress the color change of the three-dimensional structure.

In the method for manufacturing a three-dimensional structure of the invention, as a coloring ink containing a colorant, a chromatic color ink and a white ink are used, and the white ink is preferably used for forming a region on the inner side of a region formed by using the chromatic color ink.

Thereby, a region (white region) where a white ink is applied can exhibit a concealing property, and it is possible to further increase color saturation of a three-dimensional structure.

In addition, an effect obtained by controlling the surface shape of the three-dimensional structure by the difference of the viscoelasticity between the ink for forming an entity portion and the inks for forming a sacrificial layer (the first ink for forming a sacrificial layer and the second ink for forming a sacrificial layer) and an effect in which color saturation is increased act synergistically, and thus, it is possible to make an aesthetic appearance (aesthetics) of the three-dimensional structure excellent.

In the method for manufacturing a three-dimensional structure of the invention, different plural types of the first ink for forming a sacrificial layer are preferably used.

Thereby, for example, it is possible to obtain the finally obtained three-dimensional structure which has plural regions where the degrees of a matte tone are different from each other. As a result, it is possible to represent more complex appearance, and it is possible to make an aesthetic appearance (aesthetics), luxurious feeling, or the like of a three-dimensional structure excellent.

In the method for manufacturing a three-dimensional structure of the invention, different plural types of the second ink for forming a sacrificial layer are preferably used.

Thereby, for example, it is possible to obtain the finally obtained three-dimensional structure which has plural regions where the degrees of a gloss tone are different from each other. As a result, it is possible to represent more complex appearance, and it is possible to make an aesthetic appearance (aesthetics), luxurious feeling, or the like of a three-dimensional structure excellent.

According to a second aspect of the invention, there is provided a three-dimensional structure manufacturing apparatus for manufacturing a three-dimensional structure by stacking layers formed by discharging an ink including a curable resin and curing the layers, which has entity portion forming ink discharge means for discharging an ink for forming an entity portion to a region where a three-dimensional structure is configured, sacrificial layer forming ink discharge means for discharging an ink for forming a sacrificial layer forming a sacrificial layer to a region on a surface side of an outermost layer which is adjacent to a region to become the outermost layer of the three-dimensional structure, and curing means for curing the ink for forming an entity portion and the ink for forming a sacrificial layer, and has first sacrificial layer forming ink discharge means for discharging the first ink for forming a sacrificial layer and second sacrificial layer forming ink discharge means for discharging the second ink for forming a sacrificial layer as the sacrificial layer forming ink discharge means, in which the viscoelasticity of the first ink for forming a sacrificial layer at the time of curing the ink for forming an entity portion is smaller than the viscoelasticity of the ink for forming an entity portion at the time of curing the ink for forming an entity portion, and the viscoelasticity of the second ink for forming a sacrificial layer at the time of curing the ink for forming an entity portion is greater than the viscoelasticity of the ink for forming an entity portion at the time of curing the ink for forming an entity portion.

Thereby, it is possible to provide a three-dimensional structure manufacturing apparatus capable of stably and efficiently manufacturing a three-dimensional structure in which a region having an appearance of a matte tone and a region having an appearance of a gloss tone are provided at a desired portion.

According to a third aspect of the invention, there is provided an ink set which is used for manufacturing a three-dimensional structure by stacking layers formed by discharging an ink including a curable resin and curing the layers, is equipped with an ink for forming an entity portion for applying to a region where the three-dimensional structure is configured and an ink for forming a sacrificial layer for forming a sacrificial layer in a region on a surface side of an outermost layer which is adjacent to a region to become the outermost layer of the three-dimensional structure, and is equipped with the first ink for forming a sacrificial layer and the second ink for forming a sacrificial layer as the ink for forming a sacrificial layer, in which the content of a polymerization initiator in the first ink for forming a sacrificial layer is preferably smaller than the content of a polymerization initiator in the second ink for forming a sacrificial layer.

The ink set of the invention, both the first ink for forming a sacrificial layer and the second ink for forming a sacrificial layer preferably include bis(2,4,6-trimethylbenzoyl)-phenylphosphine oxide, and/or 2,4,6-trimethylbenzoyl-diphenyl-phosphine oxide as a polymerization initiator.

The ink set of the invention is an ink set which is used for manufacturing a three-dimensional structure by stacking layers formed by discharging an ink including a curable resin and curing the layers, is preferably equipped with an ink for forming an entity portion for applying to a region where the three-dimensional structure is configured and an ink for forming a sacrificial layer for forming a sacrificial layer in a region on a surface side of an outermost layer which is adjacent to a region to become the outermost layer of the three-dimensional structure, and is preferably equipped with the first ink for forming a sacrificial layer and the second ink for forming a sacrificial layer as the ink for forming a sacrificial layer, in which the viscoelasticity of the first ink for forming a sacrificial layer at the time of curing the ink for forming an entity portion is smaller than the viscoelasticity of the ink for forming an entity portion at the time of curing the ink for forming an entity portion, and the viscoelasticity of the second ink for forming a sacrificial layer at the time of curing the ink for forming an entity portion is greater than the viscoelasticity of the ink for forming an entity portion at the time of curing the ink for forming an entity portion.

Thereby, it is possible to provide an ink set which can be used for stably and efficiently manufacturing a three-dimensional structure in which a region having an appearance of a matte tone and a region having an appearance of a gloss tone are provided at a desired portion.

According to a fourth aspect of the invention, there is provided a three-dimensional structure which is manufactured using the method for manufacturing a three-dimensional structure according to the aspect of the invention.

Thereby, it is possible to provide a three-dimensional structure in which a region having an appearance of a matte tone and a region having an appearance of a gloss tone are provided at a desired portion.

The three-dimensional structure of the invention is manufactured using the three-dimensional structure manufacturing apparatus according to the aspect of the invention.

Thereby, it is possible to provide a three-dimensional structure in which a region having an appearance of a matte tone and a region having an appearance of a gloss tone are provided at a desired portion.

The three-dimensional structure of the invention is manufactured using the ink set according to the aspect of the invention.

Thereby, it is possible to provide a three-dimensional structure in which a region having an appearance of a matte tone and a region having an appearance of a gloss tone are provided at a desired portion.

BRIEF DESCRIPTION OF DRAWINGS

FIG. 1A is a cross-sectional view schematically showing each step in a preferred embodiment of the method for manufacturing a three-dimensional structure of the invention.

FIG. 1B is a cross-sectional view schematically showing each step in a preferred embodiment of the method for manufacturing a three-dimensional structure of the invention.

FIG. 1C is a cross-sectional view schematically showing each step in a preferred embodiment of the method for manufacturing a three-dimensional structure of the invention.

FIG. 1D is a cross-sectional view schematically showing each step in a preferred embodiment of the method for manufacturing a three-dimensional structure of the invention.

FIG. 2E is a cross-sectional view schematically showing each step in a preferred embodiment of the method for manufacturing a three-dimensional structure of the invention.

FIG. 2F is a cross-sectional view schematically showing each step in a preferred embodiment of the method for manufacturing a three-dimensional structure of the invention.

FIG. 2G is a cross-sectional view schematically showing each step in a preferred embodiment of the method for manufacturing a three-dimensional structure of the invention.

FIG. 2H is a cross-sectional view schematically showing each step in a preferred embodiment of the method for manufacturing a three-dimensional structure of the invention.

FIG. 3 is a cross-sectional view for schematically illustrating another surface shape capable of being formed by the invention.

FIG. 4 is a cross-sectional view schematically showing a preferred embodiment of a three-dimensional structure manufacturing apparatus of the invention.

DESCRIPTION OF EMBODIMENTS

Hereinafter, preferred embodiments of the present invention will be described in detail with reference to the accompanying drawings.

(Method for Manufacturing Three-dimensional Structure)

First, the method for manufacturing a three-dimensional structure of the invention will be described.

FIG. 1A to FIG. 1D and FIG. 2E to FIG. 2H are cross-sectional views schematically showing each step in a preferred embodiment of the method for manufacturing a three-dimensional structure of the invention, and FIG. 3 is a cross-sectional view for schematically illustrating another surface shape capable of being formed by the invention.

As shown in FIG. 1A to FIG. 1D and FIG. 2E to FIG. 2H, the method for manufacturing a three-dimensional structure 10 of the embodiment has an ink discharge step (FIG. 1A and FIG. 1C, and FIG. 2E) of discharging an ink for forming an entity portion 11' including a curable resin and an ink for forming a sacrificial layer 12' including a curable resin in a predetermined pattern by an ink jet method, a curing step (FIG. 1B and FIG. 1D, and FIG. 2F) of forming a layer 1 having an entity portion 11 and a sacrificial layer 12 by curing the ink for forming an entity portion 11' and the ink for forming a sacrificial layer 12' which are discharged, and a sacrificial layer removing step (FIG. 2H) of obtaining a temporarily formed body 10' by sequentially and repeatedly performing these steps (FIG. 2G) and then removing the sacrificial layer 12.

In the ink discharge step, the ink for forming an entity portion 11' is applied to a region to become the entity portion 11 of the three-dimensional structure 10, and the ink for forming a sacrificial layer 12' is applied to a region on the surface side of the outermost layer which is adjacent to the region to become the outermost layer of the entity portion 11 of the three-dimensional structure 10.

Additionally, as the ink for forming a sacrificial layer 12', a first ink for forming a sacrificial layer 12A' and a second ink for forming a sacrificial layer 12B' are used.

The viscoelasticity of the first ink for forming a sacrificial layer 12A' at the time of curing the ink for forming an entity portion 11' is smaller than the viscoelasticity of the ink for forming an entity portion at the time of curing the ink for forming an entity portion 11', and the viscoelasticity of the second ink for forming a sacrificial layer 12B' at the time of curing the ink for forming an entity portion 11' is greater than the viscoelasticity of the ink for forming an entity portion 11' at the time of curing the ink for forming an entity portion 11'. Moreover, the time of curing refers to a time when the ink for forming an entity portion 11' is in a semi-cured state at the time the ink for forming an entity portion 11' no longer has fluidity when cured.

By satisfying such conditions, when the ink for forming an entity portion 11' is cured, the fine wrinkles occur in the portion (the first region 11A) to become the outer surface of the entity portion 11 with which the first ink for forming a sacrificial layer 12A' is in contact, and the region (the first region 11A) in the finally obtained three-dimensional structure 10 exhibits an appearance of a matte tone, and when the ink for forming an entity portion 11' is cured, occurrence of the unintended wrinkles is prevented in the portion (the second region 11B) to become the outer surface of the entity portion 11 with which the second ink for forming a sacrificial layer 12B' is in contact, and the region (the second region 11B) in the finally obtained three-dimensional structure 10 exhibits an appearance of a gloss tone. That is, in the single three-dimensional structure 10, it is possible to easily and reliably form the region (the first region 11A) exhibiting an appearance of a matte tone and the region (the second region 11B) exhibiting an appearance of a gloss tone separately. Additionally, by satisfying the above conditions, it is possible to stably and efficiently manufacture the three-dimensional structure 10.

Moreover, in the invention, as the viscoelasticity, it is possible to employ a value obtained by measurement using various viscoelasticity measuring instrument (for example, ARES manufactured by Rheometric Scientific Inc. or the like), and, for example, it is possible to determine the relationship between viscoelasticities of both the inks from a relationship between initial viscosities (viscosities in a state before a curing reaction is proceeded) of the ink for forming an entity portion and the ink for forming a sacrificial layer (the first ink for forming a sacrificial layer and the second ink for forming a sacrificial layer) or a relationship between the degrees of cure of both the inks after a curing treatment is performed under the same conditions on the ink for forming an entity portion and the ink for forming a sacrificial layer (the first ink for forming a sacrificial layer and the second ink for forming a sacrificial layer), without actually measuring the viscosity at the time of curing of the ink for forming an entity portion.

Hereinafter, each step will be described.

(Ink Discharge Step (Ink Applying Step))

In the ink discharge step, the ink for forming an entity portion 11' including a curable resin and the ink for forming a sacrificial layer 12' including a curable resin (the first ink for forming a sacrificial layer 12A', the second ink for forming a sacrificial layer 12B') are discharged in a predetermined pattern by an ink jet method (FIG. 1A, FIG. 1C, and FIG. 2E).

More specifically, the ink for forming an entity portion 11' is applied to a region to become the entity portion 11 of the three-dimensional structure 10, and the ink for forming a sacrificial layer 12' (the first ink for forming a sacrificial layer 12A', the second ink for forming a sacrificial layer 12B') is applied to a region on the surface side of the outermost layer which is adjacent to the region to become the outermost layer of the entity portion 11 of the three-dimensional structure 10.

In the first ink discharge step, the ink (the ink for forming an entity portion 11', the ink for forming a sacrificial layer 12') is discharged on the stage 3 (FIG. 1A), and in the second or later ink discharge step, the ink (the ink for forming an entity portion 11', the ink for forming a sacrificial layer 12') is discharged on the layer 1 (FIG. 1C and FIG. 2E).

In this manner, in the invention, the ink (the ink for forming an entity portion 11') is applied to the portion to become the entity portion 11 of the three-dimensional structure 10, and the ink (the ink for forming a sacrificial layer 12') is applied to the surface side thereof.

Thereby, it is possible to adjust the surface shape of the three-dimensional structure 10, and in particular, it is possible to make the region (the first region 11A) having fine wrinkles and a surface shape exhibiting an appearance of a matte tone and the region (the second region 11B) in which occurrence of unintended wrinkles is prevented and which has a surface shape exhibiting an appearance of a gloss tone be mixed.

In addition, by forming the sacrificial layer 12 by applying the ink for forming a sacrificial layer 12' thereto, as a layer (second layer) configuring the three-dimensional structure 10, even in a case of being a layer (for example, in the figure, a relationship between the first layer and the second layer from the bottom, a relationship between the second layer and third layer from the bottom, and a relationship between the fourth layer and the fifth layer from the bottom) having a portion that protrudes from the outer peripheral portion of a lower layer (first layer) than the second layer, the sacrificial layer 12 of the lower layer (first layer) can suitably support the ink for forming an entity portion 11' for forming the upper layer (second layer). For this reason, it is possible to more suitably prevent unintended deformation (in particular, sagging or the like) of the entity portion 11 (the sacrificial layer 12 which is the first layer functions as a support material), and it is possible to make the dimensional accuracy of the finally obtained three-dimensional structure 10 excellent.

In addition, in this step, since the ink (the ink for forming an entity portion 11', the ink for forming a sacrificial layer 12') is applied by an ink jet method, it is possible to reproducibly apply ink even in a case where the applying pattern of the ink (the ink for forming an entity portion 11', the ink for forming a sacrificial layer 12') has a fine shape. As a result, it is possible to highly increase the dimensional accuracy of the finally obtained three-dimensional structure 10, and it is possible to more suitably control the surface shape of the three-dimensional structure 10 and the appearance.

Moreover, the ink for forming an entity portion 11' and the ink for forming a sacrificial layer 12' (the first ink for forming a sacrificial layer 12A', the second ink for forming a sacrificial layer 12B') will be described below.

Though the amount of ink applied in this step is not particularly limited, the thickness of the layer 1 formed in the following curing step is preferably 30 micrometers to 500 micrometers, and more preferably 70 micrometers to 150 micrometers.

Thereby, it is possible to more effectively prevent occurrence of unintended unevenness in the manufactured three-dimensional structure 10, and it is possible to make the dimensional accuracy of the three-dimensional structure 10 excellent, while making productivity of the three-dimensional structure 10 sufficiently excellent. In addition, it is possible to more suitably control the surface shape and an appearance of the finally obtained three-dimensional structure 10.

(Curing Step (Layer Forming Step))

After the ink (the ink for forming an entity portion 11', the ink for forming a sacrificial layer 12') is applied (discharged) in the ink discharge step, the curing component (curable resin) included in the ink (the ink for forming an entity portion 11', the ink for forming a sacrificial layer 12') is cured (FIG. 1B, FIG. 1D, and FIG. 2F). Thereby, the layer 1 having the entity portion 11 and the sacrificial layer 12 (the sacrificial layer 12 having the first region 12A and the second region 12B) is obtained. That is, by the curing treatment in this step, the ink for forming an entity portion 11' becomes the entity portion 11, the first ink for forming a sacrificial layer 12A' becomes the first region 12A, and the second ink for forming a sacrificial layer 12B' becomes the second region 12B.

In this step, the viscoelasticity of the ink for forming an entity portion 11' and the viscoelasticity of the ink for forming a sacrificial layer 12' (the first ink for forming a sacrificial layer 12A', the second ink for forming a sacrificial layer 12B') when the ink for forming an entity portion 11' and the ink for forming a sacrificial layer 12' are cured (moment the ink for forming an entity portion 11' is cured) satisfy a predetermined relationship.

That is, in this step, in the relationship for curing the ink for forming an entity portion 11' and the first ink for forming a sacrificial layer 12A', the viscoelasticity of the first ink for forming a sacrificial layer 12A' is smaller than the viscoelasticity of the ink for forming an entity portion 11', and in the relationship for curing the ink for forming an entity portion 11' and the second ink for forming a sacrificial layer 12B', the viscoelasticity of the second ink for forming a sacrificial layer 12B' is greater than the viscoelasticity of the ink for forming an entity portion 11'.

Thereby, at the time of curing, in the vicinity of a portion in which the ink for forming an entity portion 11' and the first ink for forming a sacrificial layer 12A' come into contact, the first ink for forming a sacrificial layer 12A' can be microscopically moved, and by stress at the time of curing, it is possible to cause fine wrinkles to occur on the surface (portion in which the ink for forming an entity portion 11' comes into contact with the first ink for forming a sacrificial layer 12A') of the entity portion 11, and as a result, the finally obtained three-dimensional structure 10 has fine wrinkles on the surface and the first region 11A as a region exhibiting an appearance of a matte tone, and at the time of curing, in the vicinity of a portion in which the ink for forming an entity portion 11' and the second ink for forming a sacrificial layer 12B' come into contact, the second ink for forming a sacrificial layer 12B' is prevented from being microscopically moved, and by stress at the time of curing, it is possible to prevent occurrence of unintended wrinkles on the surface (portion in which the ink for forming an entity portion 11' comes into contact with the second ink for forming a sacrificial layer 12B') of the entity portion 11, and as a result, the finally obtained three-dimensional structure 10 has the second region 11B in which occurrence of unintended wrinkles is prevented and of which the surface is smooth, as region exhibiting an appearance of a gloss tone.

In addition, by adjusting the time (for example, irradiation intensity of energy rays or the like) from the landing of ink to the curing completion, it is possible to easily and reliably control the degree of a matte tone in the first region 11A and the degree of a gloss tone in the second region 11B. As a result, it is possible to make the finally obtained three-dimensional structure 10 reliably have a desired appearance.

In addition, in this step, the three-dimensional structure 10 finally obtained by curing the curing component (curable resin) included in the ink is configured of a cured product, therefore, the three-dimensional structure has excellent mechanical strength and an excellent durability, for example, compared to a three-dimensional structure configured of a thermoplastic resin.

Depending on the types of curing component (curable resin), for example, in a case where the curing component (curable resin) is a thermosetting resin, this step can be performed by heating, and in a case where the curing component (curable resin) is a photocurable resin, this step can be performed by irradiation of the corresponding light (for example, in a case where the curing component (curable resin) is an ultraviolet ray curable resin, this step can be performed by irradiation of ultraviolet rays).

Moreover, in the above description, the ink is applied in the shape and the pattern corresponding to the layer 1, and thereafter, the entire layers configured of the ink are cured, however, in the invention, regarding at least a part of region, discharging of the ink and curing of the ink may be performed at the same time. That is, before the entire patterns of entire one layer 1 are formed, regarding at least a part of the region corresponding to the layer 1, the sequential curing reaction may be proceeded from the portion to which the ink is applied. Here, at least, regarding a contact portion between the ink for forming an entity portion 11' and the ink for forming a sacrificial layer 12' (portion at which the entity portion 11 and the sacrificial layer 12 come into contact with each other), a curing treatment (for example, in a case where the curable components included in both the ink are an ultraviolet ray curable resin, irradiation of ultraviolet rays) is performed at the same time, the curing treatment with respect to the ink for forming an entity portion 11' and the curing treatment with respect to the ink for forming a sacrificial layer 12' are not separately performed.

In addition, in the configuration in the figures, when each of the layers 1 is formed, the first ink for forming a sacrificial layer 12A' and the second ink for forming a sacrificial layer 12B' are used, however, in the invention, when all of the layers 1 are formed, the first ink for forming a sacrificial layer 12A' and the second ink for forming a sacrificial layer 12B' may not be used. For example, in the invention, the layer 1 formed using not the second ink for forming a sacrificial layer 12B' but the first ink for forming a sacrificial layer 12A', or the layer 1 formed using not the first ink for forming a sacrificial layer 12A' but the second ink for forming a sacrificial layer 12B' may be used.

In addition, in this step, it is not necessary to completely cure the curing component included in the ink. For example, at the time when this step ends, the ink for forming a sacrificial layer 12' is in an incompletely cured state, and the ink for forming an entity portion 11' may be cured at a higher degree of cure than that of the ink for forming a sacrificial layer 12'.

Thereby, it is possible to easily perform a sacrificial layer removing step described below in detail, and it is possible to further improve productivity of the three-dimensional structure 10.

In addition, at the time when this step ends, the ink for forming an entity portion 11' may be in an incompletely cured state. Even in such a case, for example, after the following step (for example, "ink discharge step" or the like after the layer 1 on the lower side in the curing step are formed) is performed, by performing the main curing treatment for increasing the degree of cure regarding the ink for forming an entity portion 11' (the entity portion 11) which is in an incomplete cured state, it is possible to make the mechanical strength of the finally obtained three-dimensional structure 10 excellent. In addition, by applying an ink for forming an upper layer in the state in which the ink for forming an entity portion 11' (lower layer) is in an incompletely cured state, it is possible to make the adhesion between the layers excellent.

The series of steps as described above is repeatedly performed. Thereby, a state in which the adjacent layers 1 are bound to each other is formed, and a temporarily formed body 10' in which the sacrificial layer 12 is provided on a laminate in which the layers 1 in such a state are multiply stacked, that is, the surface of the entity portion 11 is obtained (see FIG. 2G).

(Sacrificial Layer Removing Step)

In addition, after the series of steps as described above is repeatedly performed, the sacrificial layer 12 is removed (FIG. 2H).

Thereby, three-dimensional structure 10 in which the first region 11A having the surface provided with fine wrinkles are provided on the surface and the second region 11B having the flat surface on which unintended wrinkles does not occur are exposed is obtained. Such a three-dimensional structure 10 has a region (the first region 11A) having a texture of a matte tone and a region (the second region 11B) having a texture of a gloss tone.

As a method for removing the sacrificial layer 12, a method in which the sacrificial layer 12 is selectively dissolved and removed by using a liquid which selectively dissolves the sacrificial layer 12, a method in which by selectively absorbing the liquid in the sacrificial layer 12 using a liquid which is more strongly absorbed by the sacrificial layer 12 than the entity portion 11, the sacrificial layer 12 swells, or by reducing the mechanical strength of the sacrificial layer 12, the sacrificial layer 12 is peeled off or is destroyed, and the like can be exemplified.

The liquid used in this step varies depending on the constituent materials of the entity portion 11 and the sacrificial layer 12, and for example, water, alcohols such as methanol, ethanol, isopropyl alcohol, normal propyl alcohol, butanol, and isobutanol, and glycols such as glycerin, ethylene glycol, diethylene glycol, triethylene glycol, propylene glycol, and dipropylene glycol can be used. The liquid contains one type or two or more types selected from these, and into this liquid, a water-soluble substance producing hydroxide ions such as sodium hydroxide, potassium hydroxide, sodium hydrogen carbonate, or an organic amine to increase the solubility of the sacrificial layer and a surfactant to facilitate separation of the peeled sacrificial layer may be mixed.

The method for supplying the liquid to the temporarily formed body 10' is not particularly limited, and for example, an immersion method, a spraying method, a coating method, various printing methods, or the like can be adopted.

In addition, though in the above description, techniques using a liquid are described, substances having the same function (for example, solid, gas, supercritical fluid, or the like) may be used.

In addition, when applying the liquid or after applying the liquid, ultrasonic vibration may be applied.

Thereby, it is possible to promote the removal of the sacrificial layer 12, and it is possible to make productivity of the three-dimensional structure 10 excellent.

Moreover, the first region 12A and the second region 12B may be removed in the same step, or may be removed in the different steps. For example, any one of the first region 12A and the second region 12B is removed in the first sacrificial layer removing step, and then, the other one of the first region 12A and the second region 12B is removed in the second sacrificial layer removing step.

In the invention, in a state of temporarily formed body 10', in a case where the surface state of the entity portion 11 of the three-dimensional structure 10 (the first region 11A, the second region 11B) can be observed, the sacrificial layer 12

(the first region 12A, the second region 12B) may not be removed, and as in the embodiment, since the entity portion 11 is exposed by removing the sacrificial layer 12 (the first region 12A, the second region 12B), the observer can observe the surface state of the entity portion 11 (the first region 11A, the second region 11B) more suitably. Therefore, effects of the invention are more significantly exhibited.

Moreover, in a case of leaving the sacrificial layer 12, the entire portion may be left, and only the portion thereof (for example, only one of the first region 12A and the second region 12B) may be left.

Regarding expression of a matte tone, in the configuration shown in FIG. 1A to FIG. 1D and FIG. 2E to FIG. 2H, the difference of viscoelasticity between the ink for forming an entity portion 11' and the first ink for forming a sacrificial layer 12A' is used, and in the configuration shown in FIG. 3, in addition to that, the area of layer 1 is adjusted such that the level difference (unevenness) between the layers 1 in the three-dimensional structure 10 as a laminate is repeatedly present, even while maintaining the outline of the overall three-dimensional structure 10.

Thereby, fine wrinkles generated by the difference of viscoelasticity between the ink for forming an entity portion 11' and the first ink for forming a sacrificial layer 12A' and the level difference (unevenness) which is present between the layers 1 synergistically affect on an appearance of three-dimensional structure 10, and it is possible to obtain an appearance which cannot be expressed in the related art.

In the above description, though description has been made focused on a case where in the entire region to become the outermost layer of the three-dimensional structure 10, the ink for forming a sacrificial layer 12' (the first ink for forming a sacrificial layer 12A', the second ink for forming a sacrificial layer 12B') is applied so as to come into contact with the ink for forming an entity portion 11', the ink for forming a sacrificial layer 12' may be applied so as to come into contact with the ink for forming an entity portion 11' in only a portion of the region to become the outermost layer of the three-dimensional structure 10.

Thereby, in the finally obtained three-dimensional structure 10, in addition to a portion exhibiting a texture of a matte tone and a portion exhibiting a texture of a gloss tone, a portion exhibiting other textures is present, and thus, it is possible to express more complex appearance, and it is possible to make an aesthetic appearance (aesthetics), luxurious feeling, or the like of the three-dimensional structure 10 excellent.

According to the above-described manufacturing method of the invention, it is possible to stably and efficiently manufacture a three-dimensional structure in which a region having an appearance of a matte tone and a region having an appearance of a gloss tone are provided at a desired portion. In addition, since the yield of the three-dimensional structure can be improved, the invention is also advantageous from the viewpoint of reducing the manufacturing cost of a three-dimensional structure.

(Three-dimensional Structure Manufacturing Apparatus)

First, the three-dimensional structure manufacturing apparatus of the invention will be described.

FIG. 4 is a cross-sectional view schematically showing a preferred embodiment of the three-dimensional structure manufacturing apparatus of the invention.

A three-dimensional structure manufacturing apparatus 100 is an apparatus for manufacturing the three-dimensional structure 10 by repeatedly forming and stacking the layers 1 using the ink for forming an entity portion 11' and the ink for forming a sacrificial layer 12' (the first ink for forming a sacrificial layer 12A', the second ink for forming a sacrificial layer 12B').

As shown in FIG. 4, the three-dimensional structure manufacturing apparatus 100 has a control portion 2, a stage 3, an entity portion forming ink discharge portion (entity portion forming ink applying means) 4 for discharging the ink for forming an entity portion 11', a sacrificial layer forming ink discharge portion (sacrificial layer forming ink applying means) 5 for discharging the ink for forming a sacrificial layer 12', and an energy ray irradiation means (curing means) 6 for irradiating energy rays to cure the ink for forming an entity portion 11' and the ink for forming a sacrificial layer 12'.

The control portion 2 has a computer 21 and a driving control portion 22.

The computer 21 is a general desk type computer which is configured to equip a CPU and a memory therein. The computer 21 converts the shape of the three-dimensional structure 10 to model data, and a cross-sectional data (slice data) obtained by slicing the model data into several parallel layer of a thin cross-sectional body is output to the driving control portion 22.

The driving control portion 22 functions as control means for driving the entity portion forming ink discharge portion (entity portion forming ink applying means) 4, the sacrificial layer forming ink discharge portion (sacrificial layer forming ink applying means) 5, and the energy ray irradiation means (curing means) 6, respectively. Specifically, for example, the driving control portion 22 controls a discharge pattern and a discharge amount of the ink for forming an entity portion 11' by the entity portion forming ink discharge portion (entity portion forming ink applying means) 4, a discharge pattern and a discharge amount of the ink for forming a sacrificial layer 12' by the sacrificial layer forming ink discharge portion (sacrificial layer forming ink applying means) 5, and an irradiation amount and irradiation timing of energy rays by the energy ray irradiation means (curing means) 6 or the like.

The stage 3 is a region in which the ink for forming an entity portion 11' and the ink for forming a sacrificial layer 12' are applied.

The stage 3 has the flat surface (a portion to which the ink for forming an entity portion 11' and the ink for forming a sacrificial layer 12' are applied).

Thereby, it is possible to easily and reliably form the layer 1 having high thickness uniformity. In addition, it is possible to effectively prevent occurrence of unintended deformation on the three-dimensional structure 10 to be manufactured.

The stage 3 is preferably configured of a material having high strength. As the configuration material of the stage 3, various metal materials such as stainless steel can be exemplified.

In addition, the surface (a portion to which the ink for forming an entity portion 11' and the ink for forming a sacrificial layer 12' are applied) of the stage 3 may be subjected to a surface treatment.

Thereby, for example, it is possible to more effectively prevent the configuration material of the ink for forming an entity portion 11' or the configuration material of the ink for forming a sacrificial layer 12' from being attached to the stage 3, it is possible to make durability of the stage 3 excellent, or it is possible to stably produce the three-dimensional structure 10 over a long period of time. As the material used in the surface treatment of the surface of the stage 3, fluorine resins such as polytetrafluoroethylene and the like can be exemplified.

The entity portion forming ink discharge portion (entity portion forming ink applying means) 4 discharges the ink for forming an entity portion 11' by an ink jet method.

By equipping such an entity portion forming ink discharge portion (entity portion forming ink applying means) 4, it is possible to apply only a desired amount of the ink for forming an entity portion 11' at a desired portion in fine patterns, and it is even possible to manufacture the three-dimensional structure 10 having a fine configuration with excellent productivity.

As a liquid droplet discharge system (system of an ink jet method), a piezo system or a system for discharging an ink by bubbles generated by heating the ink can be exemplified, and from the viewpoint of the difficulty in changing in quality of a constituent of an ink, the piezo system is preferable.

In the entity portion forming ink discharge portion (entity portion forming ink applying means) 4, a pattern to be formed, the amount of the ink for forming an entity portion 11' to be applied, or the like is controlled by the instructions from the driving control portion 22. The discharge pattern, the discharge amount, or the like of the ink for forming an entity portion 11' by the entity portion forming ink discharge portion (entity portion forming ink applying means) 4 is determined based on the slice data.

Thereby, it is possible to apply the necessary and sufficient amount of the ink for forming a the entity portion 11' to a portion of interest, it is possible to reliably form the entity portion 11 having a desired pattern, and it is possible to more reliably make the dimensional accuracy and the mechanical strength of the three-dimensional structure 10 excellent. In addition, in a case where the ink for forming an entity portion 11' includes a colorant, it is possible to reliably obtain a desired color and shape.

The entity portion forming ink discharge portion (entity portion forming ink applying means) 4 is movable in the X- and the Y-direction against the stage relatively, and is also movable in the Z-direction.

Thereby, even in a case where the layers 1 are stacked, it is possible to maintain the distance of the nozzle surface (discharge portion tip) of the entity portion forming ink discharge portion (entity portion forming ink applying means) 4 and the landing portion of the ink for forming an entity portion 11' in a predetermined value.

The sacrificial layer forming ink discharge portion (sacrificial layer forming ink applying means) 5 discharges the ink for forming a sacrificial layer 12' by an ink jet method.

The three-dimensional structure manufacturing apparatus 100 is equipped with a first sacrificial layer forming ink discharge portion (first sacrificial layer forming ink applying means) 5A for discharging the first ink for forming a sacrificial layer 12A' and a second sacrificial layer forming ink discharge portion (second sacrificial layer forming ink applying means) 5B for discharging the second ink for forming a sacrificial layer 12B' as the sacrificial layer forming ink discharge portion (sacrificial layer forming ink applying means) 5.

By equipping such a sacrificial layer forming ink discharge portion (sacrificial layer forming ink applying means) 5, it is possible to apply only a desired amount of the ink for forming a sacrificial layer 12' (the first ink for forming a sacrificial layer 12A', the second ink for forming a sacrificial layer 12B') at a desired portion in fine patterns, it is possible to form the sacrificial layer 12 (the first region 12A, the second region 12B) having a desired size and shape at a desired portion even in a case where the three-dimensional structure 10 to be manufactured has fine structures, and it is possible to more reliably form the surface shape and an appearance of the three-dimensional structure 10. In addition, it is possible to make productivity of the three-dimensional structure 10 excellent.

A liquid droplet discharge system (system of an ink jet method), control, driving, and the like of the sacrificial layer forming ink discharge portion (sacrificial layer forming ink applying means) 5 are the same as those of the entity portion forming ink discharge portion (entity portion forming ink applying means) 4 described above.

The energy ray irradiation means (curing means) 6 irradiates energy rays to cure the ink for forming an entity portion 11' and the ink for forming a sacrificial layer 12'.

By equipping such curing means 6, it is possible to make the mechanical strength of the finally obtained three-dimensional structure 10 excellent, and it is possible to reliably control the surface shape and an appearance of the three-dimensional structure 10.

The energy ray irradiation means (curing means) 6 has an irradiation area capable of irradiating energy rays at the same time with respect to the ink for forming an entity portion 11' and the ink for forming a sacrificial layer 12' at least at the contact portion (portion at which the entity portion 11 and the sacrificial layer 12 come into contact with each other) between the ink for forming an entity portion 11' and the ink for forming a sacrificial layer 12' (the first ink for forming a sacrificial layer 12A', the second ink for forming a sacrificial layer 12B').

The type of energy rays which the energy ray irradiation means (curing means) 6 irradiates varies depending on the configuration materials of the ink for forming an entity portion 11' and the ink for forming a sacrificial layer 12', and ultraviolet rays, visible rays, infrared rays, X-rays, gamma-rays, an electron beam, an ion beam, and the like can be exemplified. Among these, ultraviolet rays are preferably used from the viewpoint of cost and productivity of a three-dimensional structure.

Moreover, although not shown in the drawing, the three-dimensional structure manufacturing apparatus 100 may be equipped with sacrificial layer removing means for removing the sacrificial layer 12 or drying means for drying the three-dimensional structure 10 from which a sacrificial layer is removed.

As the sacrificial layer removing means, means for mechanically destroying and removing the sacrificial layer 12, a vessel accommodating the liquid as described above, into which the temporarily formed body 10' is immersed, liquid spraying means for spraying the liquid as described above towards the temporarily formed body 10', liquid coating means for coating the temporarily formed body 10' with the liquid as described above, and the like can be exemplified.

As the drying means, means for supplying a heated gas or a dried gas as described above, decompression means for decompressing the space in which the three-dimensional structure 10 is accommodated, and the like can be exemplified.

In addition, the three-dimensional structure manufacturing apparatus of the invention may be an apparatus performing at least a part among the above-described steps, and at least a part among the above-described steps may be performed without using the three-dimensional structure manufacturing apparatus.

Moreover, the three-dimensional structure manufacturing apparatus of the invention may be an apparatus which is used in manufacturing a three-dimensional structure having a region of a matte tone and a region of a gloss tone, and for example, it is also possible to use the apparatus in manufacturing a plurality of a three-dimensional structure having different surface states. More specifically, for example, the three-dimensional structure manufacturing apparatus of the invention may be an apparatus which is used in manufacturing a three-dimensional structure which has a region of a matte tone and does not have a region of a gloss tone and a three-dimensional structure which has a region of a gloss tone and does not have a region of a matte tone.

According to the three-dimensional structure manufacturing apparatus of the invention as described above, it is possible to stably and efficiently manufacture a three-dimensional structure in which a region having an appearance of a matte tone and a region having an appearance of a gloss tone are provided at a desired portion. In addition, the three-dimensional structure manufacturing apparatus can be used in suitably forming a three-dimensional structure having an appearance of a matte tone and a three-dimensional structure having an appearance of a gloss tone separately. In addition, since the yield of the three-dimensional structure can be improved, the invention is also advantageous from the viewpoint of reducing the manufacturing cost of a three-dimensional structure.

(Ink Set)

Next, the ink set of the invention will be described.

The ink set of the invention may be an ink set which is equipped with at least one of the ink for forming an entity portion 11', at least one of the first ink for forming a sacrificial layer 12A', and at least one of the second ink for forming a sacrificial layer 12B'. The ink set of the invention is applied to the method for manufacturing a three-dimensional structure of the invention and the three-dimensional structure manufacturing apparatus as described above.

(Ink for Forming Entity Portion)

The ink for forming an entity portion 11' includes at least a curable resin (curing component).

(Curable Resin 1)

Example of the curable resin (curing component) include a thermosetting resin; and various photocurable resins such as a visible light curable resin which is cured by light in the visible light region (photocurable resin in the narrow sense); an ultraviolet ray curable resin; an infrared ray curable resin; and an X-ray curable resin, and one type or two or more types selected from these can be used singly or in combination.

Among these, from the viewpoint of the mechanical strength of the obtained three-dimensional structure 10, productivity of the obtained three-dimensional structure 10, and storage stability of the ink for forming an entity portion 11', in particular, an ultraviolet ray curable resin (polymerizable compound) is preferable.

As the ultraviolet ray curable resin (polymerizable compound), a resin in which an addition polymerization or a ring-opening polymerization is initiated by radical species or cationic species generated from a photopolymerization initiator by irradiation of ultraviolet rays, and a polymer is generated is preferably used. As the polymerization mode of addition polymerization, a radical, a cationic, an anionic, a metathesis, and a coordination polymerization can be exemplified. In addition, as the polymerization mode of ring-opening polymerization, a cationic, an anionic, a radical, a metathesis, and a coordination polymerization can be exemplified.

Examples of the addition polymerizable compound include compounds having at least one ethylenically unsaturated double bond. As the addition polymerizable compound, a compound having at least one terminal ethylenically unsaturated bond, and preferably two or more terminal ethylenically unsaturated bonds can be preferably used.

The ethylenically unsaturated polymerizable compound includes a monofunctional polymerizable compound, a polyfunctional polymerizable compound, or a chemical form of mixture of these.

Examples of the monofunctional polymerizable compound include an unsaturated carboxylic acid (for example, acrylic acid, methacrylic acid, itaconic acid, crotonic acid, isocrotonic acid, and maleic acid), esters thereof, and amides.

As the polyfunctional polymerizable compound, esters of an unsaturated carboxylic acid and an aliphatic polyol compound, or an amide of an unsaturated carboxylic acid and an aliphatic amine compound may be used.

In addition, a product of an addition reaction between unsaturated carboxylic acid esters or amides, which have a nucleophilic substituent such as a hydroxyl group, an amino group, or a mercapto group, and isocyanates or epoxies, a product of a de-hydration condensation reaction between the above unsaturated carboxylic acid esters or amides and carboxylic acids, and the like also can be used. Moreover, a product of an addition reaction between unsaturated carboxylic acid esters or amides, which have an electrophilic substituent such as an isocyanate group or an epoxy group, and alcohols, amines, or thiols, and a product of a substitution reaction between unsaturated carboxylic acid esters or amides, which have a leaving substituent such as a halogen group or a tosyloxy group, and alcohols, amines, or thiols also can be used.

Specific examples of the radical polymerizable compound which is an ester of an unsaturated carboxylic acid and an aliphatic polyol compound, (meth)acrylic acid ester is representatively exemplified, and any of a monofunctional compound and polyfunctional compound can be used.

Specific examples of a monofunctinoal (meth)acrylate include tolyoxyethyl (meth)acrylate, phenyloxyethyl (meth)acrylate, cyclohexyl (meth)acrylate, ethyl (meth)acrylate, methyl (meth)acrylate, isobornyl (meth)acrylate, dipropylene glycol di(meth)acrylate, tetrahydrofurfuryl (meth)acrylate, ethoxyethoxyethyl (meth)acrylate, (meth)acrylic acid 2-(2-vinyloxyethoxy)ethyl, 2-hydroxy-3-phenoxypropyl (meth)acrylate, and 4-hydroxybutyl (meth)acrylate.

Specific examples of a bifunctional (meth)acrylate include ethylene glycol di(meth)acrylate, triethylene glycol di (meth) acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, and dipentaerythritol di(meth)acrylate.

Specific examples of a trifunctional (meth)acrylate include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl)ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylol propane tri(meth)acrylate, and sorbitol tri(meth)acrylate.

Specific examples of a tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of a pentafunctional (meth)acrylate include sorbitol penta(meth)acrylate and dipentaerythritol penta(meth)acrylate.

Specific examples of a hexafunctional (meth)acrylate include dipentaerythritol hexa(meth)acrylate, sorbitol hexa (meth)acrylate, alkylene oxide-modified hexa(meth)acrylate of phosphazene, and caprolactone-modified dipentaerythritol hexa(meth)acrylate.

Examples of polymerizable compounds other than (meth) acrylates include itaconic acid ester, crotonic acid ester, isocrotonic acid ester, and maleic acid ester.

Examples of the itaconic acid ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonic acid ester include ethylene glycol dicrotonate, tetramethylene glycol dicrotonate, pentaerythritol dicrotonate, and sorbitol tetradicrotonate.

Examples of the isocrotonic acid ester include ethylene glycol diisopropylene crotonate, pentaerythritol isocrotonate, and sorbitol tetraisocrotonate.

Examples of the maleic acid ester include ethylene glycol dimaleate, triethylene glycol dimaleate, pentaerythritol dimaleate, and sorbitol tetramaleate.

As examples of other esters, for example, aliphatic alcohol-based esters described in JP-B-46-27926, JP-B-51-47334, and JP-A-57-196231, esters having a aromatic structure described in JP-A-59-5240, JP-A-59-5241, and JP-A-2-226149, and esters containing an amine group described in JP-A-1-165613 can also be used.

In addition, specific examples of the amide monomer of an unsaturated carboxylic acid and an aliphatic amine compound include methylene bis-acrylamide, methylene bis-methacrylamide, 1,6-hexamethylene-bis-acrylamide, 1,6-hexamethylene-bis-methacrylamide, diethylenetriamine trisacrylamide, xylylene bis-acrylamide, xylylene bis-methacrylamide, and (meth)acryloyl morpholine.

As other preferred amide-based monomers, an amide-based monomer having a cyclohexylene structure described in JP-B-54-21726 can be exemplified.

In addition, a urethane-based addition polymerizable compound manufactured by an addition reaction between isocyanate and a hydroxy group is also suitable, and as such a specific example, a vinyl urethane compound containing two or more polymerizable vinyl groups in a molecule obtained by adding a vinyl monomer containing a hydroxyl group represented by the following formula (1) to a polyisocyanate compound having two or more isocyanate groups in a molecule described in JP-B-48-41708 can be exemplified.

$$CH_2=C(R^1)COOCH_2CH(R^2)OH \qquad (1)$$

(here, in the formula (1), each of $R^1$ and $R^2$ independently represents H or $CH_3$.)

In the invention, a cationic ring-opening polymerizable compound having one or more cyclic ether groups such as an epoxy group or an oxetane group in a molecule can be suitably used as an ultraviolet ray curable resin (polymerizable compound).

As the cationic polymerizable compound, curable compounds including a ring-opening polymerizable group can be exemplified, and among these, a heterocyclic group-containing curable compound is particularly preferable. Examples of such curable compounds include cyclic imino ethers such as epoxy derivatives, oxetane derivatives, tetrahydrofuran derivatives, cyclic lactone derivatives, cyclic carbonate derivatives, and oxazoline derivatives, and vinyl ethers, and among these, epoxy derivatives, oxetane derivatives and vinyl ethers are preferable.

Examples of the preferred epoxy derivatives include monofunctional glycidyl ethers, polyfunctional glycidyl ethers, monofunctional alicyclic epoxy s, and polyfunctional alicyclic epoxys.

Examples of the specific compounds of glycidyl ethers include diglycidyl ethers (for example, ethylene glycol diglycidyl ether, bisphenol A diglycidyl ether, and the like), tri- or higher functional glycidyl ethers (for example, trimethylol ethane triglycidyl ether, trimethylol propane triglycidyl ether, glycerol triglycidyl ether, triglycidyl trishydroxyethyl isocyanurate, and the like), tetra or higher functional glycidyl ethers (for example, sorbitol tetraglycidyl ether, pentaerythritol tetraglycyl ether, polyglycidyl ether of a cresol novolac resin, polyglycidyl ether of a phenolic novolac resin, and the like), alicyclic epoxies (for example, Celloxide 2021P, Celloxide 2081, Epolead GT-301, Epolead GT-401 (manufactured by Daicel Chemical Industries, Ltd.)), EHPE (manufactured by Daicel Chemical Industries, Ltd.), polycyclohexyl epoxymethyl ether of a phenolic novolac resin, and the like), and oxetanes (for example, OX-SQ, PNOX-1009 (hereinbefore, manufactured by Toagosei Co., Ltd.), and the like).

As the polymerizable compound, alicyclic epoxy derivatives can be preferably used.

"Alicyclic epoxy group" refers to a substructure obtained by epoxidizing the double bond in the cycloalkene ring of a cyclopentene group, a cyclohexene group, or the like with a suitable oxidant such as hydrogen peroxide, peroxy acid, or the like.

As the alicyclic epoxy compound, polyfunctional alicyclic epoxy compounds having two or more cyclohexene oxide groups or cyclopentene oxide groups in a molecule is preferable. Specific examples of the alicyclic epoxy compound include 4-vinylcyclohexene dioxide, (3,4-epoxycyclohexyl)methyl-3,4-epoxycyclohexyl carboxylate, di(3,4-epoxycyclohexyl)adipate, di(3,4-epoxycyclohexylmethyl) adipate, bis(2,3-epoxycyclopentyl)ether, di(2,3-epoxy-6-methylcyclohexylmethyl)adipate, and dicyclopentadiene dioxide.

A glycidyl compound having an ordinary epoxy group which does not have an alicyclic structure in the molecule may be used alone or in combination with the above alicyclic epoxy compounds.

As such an ordinary glycidyl compound, a glycidyl ether compound and a glycidyl ester compound can be exemplified, and the glycidyl ether compound is preferably used in combination.

Specific examples of the glycidyl ether compound include aromatic glycidyl ether compounds such as 1,3-bis(2,3-epoxypropyloxy)benzene, a bisphenol A type epoxy resin, a bisphenol F type epoxy resin, a phenol novolac type epoxy resin, a cresol novolac type epoxy resin, and a trisphenolmethane type epoxy resin, and aliphatic glycidyl ether compounds such as 1,4-butanediol glycidyl ether, glycerol triglycidyl ether, propylene glycol diglycidyl ether, and trimethylolpropane tritriglycidyl ether. As the glycidyl ester, a glycidyl ester of a linolenic acid dimer and the like can be exemplified.

As the polymerizable compound, a compound (hereinafter, simply referred to as "oxetane compound") having an oxetanyl group which is a cyclic ether having a four-membered ring can be used. An oxetanyl group-containing compound is a compound having one or more oxetanyl groups in a molecule.

The ink for forming an entity portion 11', among the curing components described above, in particular, preferably includes one type or two or more types selected from the group consisting of 2-(2-vinyloxyethoxy)ethyl (meth)acrylate, polyether-based aliphatic urethane (meth)acrylate oligomer, 2-hydroxy-3-phenoxypropyl (meth)acrylate, and 4-hydroxybutyl (meth)acrylate.

Thereby, it is possible to cure the ink for forming an entity portion 11' at a more suitable curing rate, it is possible to more suitably control the surface shape of the three-dimensional structure 10 (the entity portion 11), and it is possible to make productivity of a three-dimensional structure 10 excellent.

In addition, it is possible to make the mechanical strength and shape stability of the entity portion 11 formed by curing the ink for forming an entity portion 11' excellent. As a result, it is possible to make strength, durability, reliability of the three-dimensional structure 10 excellent.

In addition, by including these curing component, it is possible to make a solubility and a swelling property of a cured product of the ink for forming an entity portion 11' with respect to various solvents (for example, water and the like) particularly low. As a result, it is possible to more reliably remove the sacrificial layer 12 (the first region 12A, the second region 12B) with high selectivity in the sacrificial layer removing step, and it is possible to prevent unintended deformation due to occurrence of defects in the entity portion 11. As a result, it is possible to more reliably further increase the dimensional accuracy of the three-dimensional structure 10.

In addition, since it is possible to make a swelling property (absorbability of a solvent) of a cured product of the ink for forming an entity portion 11' low, for example, it is possible to omit or simplify a drying treatment as a post-treatment after the sacrificial layer removing step.

In addition, since solvent resistance of the finally obtained three-dimensional structure 10 can also be improved, reliability of the three-dimensional structure 10 is particularly high.

In particular, in a case where the ink for forming an entity portion 11' includes 2-(2-vinyloxyethoxy)ethyl (meth)acrylate, oxygen inhibition is less likely occur, and thus, it is possible to perform curing at more low energy. It is also possible to promote copolymerization including other monomers, and it is possible to make the strength of the three-dimensional structure 10 particularly high.

In addition, in a case where the ink for forming an entity portion 11' includes a polyether-based aliphatic urethane (meth)acrylate oligomer, it is possible to achieve both high strength and high toughness of the three-dimensional structure 10 at a higher level.

In addition, in a case where the ink for forming an entity portion 11' includes 2-hydroxy-3-phenoxypropyl (meth)acrylate, it is possible to improve a breaking elongation having a flexibility.

In addition, in a case where the ink for forming an entity portion 11' includes 4-hydroxybutyl (meth)acrylate, in addition to the self-cured product formed in the previous layer, adhesion to PMMA particles, PEMA particles, silica particles, or metal particles is improved, and it is possible to make the strength of the three-dimensional structure 10 particularly high.

In a case where the ink for forming an entity portion 11' includes a specific curing component described above (one type or two or more types selected from the group consisting of 2-(2-vinyloxyethoxy)ethyl (meth)acrylate, polyether-based aliphatic urethane (meth)acrylate oligomer, 2-hydroxy-3-phenoxypropyl (meth)acrylate, and 4-hydroxybutyl (meth)acrylate), the proportion of the specific curing component with respect to the entire curing components configuring the ink for forming an entity portion 11' is preferably equal to or greater than 80% by mass, more preferably equal to or greater than 90% by mass, and still more preferably 100% by mass. Thereby, effects as described above are more significantly exhibited.

The content of the curing component in the ink for forming an entity portion 11' is preferably 80% by mass to 97% by mass, and more preferably 85% by mass to 95% by mass.

Thereby, it is possible to make the mechanical strength of the finally obtained three-dimensional structure 10 excellent. In addition, it is possible to make productivity of the three-dimensional structure 10 excellent.

(Polymerization Initiator 1)

In addition, the ink for forming an entity portion 11' preferably includes a polymerization initiator.

Thereby, it is possible to increase the curing rate of the ink for forming an entity portion 11' when the three-dimensional structure 10 is manufactured, and it is possible to make productivity of the three-dimensional structure 10 excellent.

As the polymerization initiator, for example, a photo-radical polymerization initiator (aromatic ketones, an acyl phosphine oxide compound, an aromatic onium salt compound, an organic peroxide, a thio compound (a thioxanthone compound, a thiophenyl group-containing compound, and the like), a hexaaryl biimidazole compound, a ketooxime ester compound, a borate compound, an azinium compound, a metallocene compound, an active ester compound, a compound having a carbon-halogen bond, an alkyl amine compound, and the like), or a photo-cationic polymerization initiator can be used, and specific examples thereof include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro-benzophenone, 4,4'-dimethoxy benzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropyl thioxanthone, 2-chlorothioxanthone, 2-methyl-1-[4-(methylthio)phenyl]-2-morpholino-propan-1-one, bis(2,4,6-trimethylbenzoyl)-phenyl phosphine oxide, 2,4,6-trimethyl benzoyl-diphenyl-phosphine oxide, 2,4-diethyl thioxanthone, and bis-(2,6-dimethoxybenzoyl)-2,4,4-trimethyl pentyl phosphine oxide. One type or two or more types selected from these can be used singly or in combination.

Among these, a polymerization initiator configuring the ink for forming an entity portion 11' preferably includes bis(2,4,6-trimethylbenzoyl)-phenyl phosphine oxide or 2,4,6-trimethylbenzoyl-diphenyl-phosphine oxide.

Thereby, in a case where such a polymerization initiator is included in the ink, it is possible to cure the ink for forming an entity portion 11' at a more suitable curing rate, it is possible to more suitably control the surface shape of the three-dimensional structure 10 (the entity portion 11), and it is possible to make productivity of a three-dimensional structure 10 excellent.

In addition, it is possible to make the mechanical strength and shape stability of the entity portion 11 formed by curing the ink for forming an entity portion 11' excellent. As a result, it is possible to make strength, durability, reliability of the three-dimensional structure 10 excellent.

In particular, in a case where the ink for forming an entity portion 11' includes bis(2,4,6-trimethylbenzoyl)-phenylphosphine oxide as a polymerization initiator together with the ink for forming a sacrificial layer 12' (the first ink for forming a sacrificial layer 12A', the second ink for forming a sacrificial layer 12B') described below in detail, it is possible to more suitably control the curing rate with respect to the ink for forming an entity portion 11' and the ink for forming a sacrificial layer 12' (the first ink for forming a sacrificial layer 12A' and the second ink for forming a sacrificial layer 12B'), and it is possible to more reliably obtain a desired appearance at a desired portion in the three-dimensional structure 10. That is, it is possible to more reliably obtain an appearance of a matte tone in the first region 11A and an appearance of a gloss tone in the second region 11B. In addition, it is possible to make productivity of the three-dimensional structure 10 excellent.

When the ink for forming an entity portion 11' includes bis(2,4,6-trimethylbenzoyl)-phenylphosphine oxide as a polymerization initiator together with the ink for forming a sacrificial layer 12' (the first ink for forming a sacrificial layer 12A', the second ink for forming a sacrificial layer 12B') described below in detail, the content of bis(2,4,6-trimethylbenzoyl)-phenylphosphine oxide in the ink for forming an entity portion 11' is preferably higher than the content of bis(2,4,6-trimethylbenzoyl)-phenylphosphine oxide in the ink for forming a sacrificial layer 12' (the first ink for forming a sacrificial layer 12A', the second ink for forming a sacrificial layer 12B').

Thereby, it is possible to respectively cure the ink for forming an entity portion 11' and the inks for forming a sacrificial layer 12' (the first ink for forming a sacrificial layer 12A' and the second ink for forming a sacrificial layer 12B') at a more suitable curing rate, and it is possible to more reliably obtain a desired appearance at a desired portion in the three-dimensional structure 10.

The content of a polymerization initiator in the ink for forming an entity portion 11' is not particularly limited, however is preferably higher than the content of a polymerization initiator in the ink for forming a sacrificial layer 12'.

Thereby, it is possible to cure each of the ink for forming an entity portion 11' and the ink for forming a sacrificial layer 12' at a more suitable rate, and it is possible to more suitably control the surface shape of the three-dimensional structure 10 (the entity portion 11).

In addition, for example, by adjusting the treatment conditions in the curing step, after the curing step ends, it is possible to make a polymerization degree of the sacrificial layer 12 relatively low while sufficiently increasing a degree of cure of the entity portion 11. As a result, it is possible to more easily remove the sacrificial layer 12 in the sacrificial layer removing step, and it is possible to make productivity of the three-dimensional structure 10 excellent.

In addition, since there is no need to unnecessarily increase the amount of energy ray to be radiated, this is preferable from the viewpoint of saving energy.

In particular, when the content of the polymerization initiator in the ink for forming an entity portion 11' is defined as $X_1$ [% by mass], and the content of the polymerization initiator in the ink for forming a sacrificial layer 12' is defined as $X_2$ [% by mass], the relationship of 1.05 smaller than or equal to $X_1/X_2$ smaller than or equal to 2.0 is preferably satisfied, and the relationship of 1.1 smaller than or equal to $X_1/X_2$ smaller than or equal to 1.5 is more preferably satisfied.

Thereby, it is possible to cure each of the ink for forming an entity portion 11' and the ink for forming a sacrificial layer 12' at a more suitable rate, and it is possible to more suitably control the surface shape of the three-dimensional structure 10 (the entity portion 11).

The specific value of the content of the polymerization initiator in the ink for forming an entity portion 11' is preferably 3.0% by mass to 18% by mass, and more preferably 5.0% by mass to 15% by mass.

Thereby, it is possible to cure the ink for forming an entity portion 11' at a more suitable curing rate, it is possible to more suitably control the surface shape of the three-dimensional structure 10 (the entity portion 11), and it is possible to make productivity of a three-dimensional structure 10 excellent.

In addition, it is possible to make the mechanical strength and shape stability of the entity portion 11 formed by curing the ink for forming an entity portion 11' excellent.

As a result, it is possible to make strength, durability, reliability of the three-dimensional structure 10 excellent.

A preferred specific example of the mixing ratio (ink constitution except for "other components" described below) of a curable resin and a polymerization initiator in the ink for forming an entity portion 11' is shown below, however, needless to say, the constitution of the ink for forming an entity portion in the invention is not limited to that described below.

(Mixing Ratio Example)

2-(2-Vinyloxyethoxy)ethyl acrylate: 32 parts by mass

Polyether-based aliphatic urethane acrylate oligomer: 10 parts by mass

2-Hydroxy-3-phenoxypropyl acrylate: 13.75 parts by mass

Dipropylene glycol diacrylate: 15 parts by mass

4-Hydroxybutyl acrylate: 20 parts by mass

Bis(2,4,6-trimethylbenzoyl)-phenylphosphine oxide: 5 parts by mass 2,4,6-Trimethylbenzoyl-diphenyl-phosphine oxide: 4 parts by mass In a case of mixing as described above, effects as described above are more significantly exhibited.

(Other Components 1)

In addition, the ink for forming an entity portion 11' may include components other than the components described above.

Examples of such components include various colorants such as a pigment and a dye;

a dispersant; a surfactant; a sensitizer; a polymerization accelerator; a solvent; a penetration enhancer; a wetting agent (humectant); a fixing agent; a fungicide; a preservative; an antioxidant; an ultraviolet absorbent; a chelating agent; a pH adjusting agent; a thickener; a filler; an aggregation preventing agent; and a defoamer.

In particular, when the ink for forming an entity portion 11' includes a colorant, it is possible to obtain the three-dimensional structure 10 which is colored in the color corresponding to the color of the colorant.

In particular, by including a pigment as a colorant, it is possible to make the light resistance of the ink for forming an entity portion 11' and the three-dimensional structure 10 more favorable. Both an inorganic pigment and an organic pigment can be used as the pigment.

Examples of the inorganic pigment include carbon blacks (C. I. Pigment Black 7) such as a furnace black, a lamp black, an acetylene black, and a channel black, iron oxide, and titanium oxide, and one type or two or more types selected from these can be used singly or in combination.

Among the inorganic pigments, titanium oxide is preferable in order to exhibit a preferred white color.

Examples of the organic pigments include azo pigments such as an insoluble azo pigment, a condensed azo pigment, an azo lake, and a chelate azo pigment, polycyclic pigments such as a phthalocyanine pigment, a perylene, a perinone pigment, an anthraquinone pigment, a quinacridone pigment, a dioxane pigment, a thioindigo pigment, an isoindolinone pigment, and a quinophthalone pigment, a dye chelate (for example, a base dye type chelate, an acid dye type chelate, and the like), a dyeing lake (a basic dye type lake and an acidic dye type lake), a nitro pigment, a nitroso pigment, an aniline black, and a daylight fluorescent pigment, and one type or two or more types selected from these can be used singly or in combination.

More specifically, examples of the carbon black used as a black pigment include No. 2300, No. 900, MCF 88, No. 33, No. 40, No. 45, No. 52, MA 7, MA 8, MA 100, No. 2200B, and the like (hereinbefore, manufactured by Mitsubishi Chemical Corporation), Raven 5750, Raven 5250, Raven 5000, Raven 3500, Raven 1255, Raven 700, and the like (hereinbefore, manufactured by Carbon Columbia, Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (hereinbefore, manufactured by CABOT JAPAN K. K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (hereinbefore, manufactured by Degussa).

Examples of the white pigment include C. I. Pigment White 6, 18 and 21.

Examples of the yellow pigment include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta pigment include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C. I. Pigment Violet 19, 23, 32, 33, 36, 38, 43, and 50.

Examples of the cyan pigment include C. I. Pigment Blue 1, 2, 3, 15, 15:1, 15:2, 15:3, 15:34, 15:4, 16, 18, 22, 25, 60, 65, and 66, and C. I. Vat Blue 4 and 60.

In addition, examples of the pigments other than the pigments described above include C. I. Pigment Green 7, 10, C. I. Pigment Brown 3, 5, 25, 26, and C. I. Pigment Orange 1, 2, 5, 7, 13, 14, 15, 16, 24, 34, 36, 38, 40, 43 and 63.

In a case where the ink for forming an entity portion 11' includes a pigment, the average particle size of the pigment is preferably equal to or less than 300 nm, and more preferably 50 nm to 250 nm.

Thereby, it is possible to be make the discharge stability of the ink for forming an entity portion 11' and the dispersion stability of the pigment in the ink for forming an entity portion 11' excellent, and it is possible to form an image having excellent image quality.

In addition, examples of the dyes include an acid dye, a direct dye, a reactive dye, and a basic dye, and one type or two or more types selected from these can be used singly or in combination.

Specific examples of the dye include C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171 and 195, C. I. Reactive Red 14, 32, 55, 79, and 249, and C. I. Reactive Black 3, 4, and 35.

In a case where the ink for forming an entity portion 11' includes a colorant, the content of the colorant in the ink for forming an entity portion 11' is preferably 1% by mass to 20% by mass. Thereby, an excellent concealing property and color reproducibility are obtained.

In particular, in a case where the ink for forming an entity portion 11' includes titanium oxide as a colorant, the content of the titanium oxide in the ink for forming an entity portion 11' is preferably 12% by mass to 18% by mass, and more preferably 14% by mass to 16% by mass. Thereby, an excellent concealing property is obtained.

In a case where the ink for forming an entity portion 11' includes a pigment, if a dispersant is further included in the ink for forming an entity portion 11', it is possible to make the dispersibility of the pigment more favorable.

Examples of the dispersant, which are not particularly limited, include dispersants which are commonly used in the preparation of pigment dispersions such as a polymer dispersant.

Specific examples of the polymer dispersant include dispersants containing one or more types among polyoxyalkylene polyalkylene polyamine, a vinyl-based polymer and copolymer, an acrylic polymer and copolymer, polyester, polyamide, polyimide, polyurethane, an amino-based polymer, a silicon-containing polymer, a sulfur-containing polymer, a fluorine-containing polymer, and an epoxy resin, as a main component.

Examples of commercially available polymer dispersants include Ajisper series manufactured by Ajinomoto Fine-Techno Co., Inc., Solsperse series (Solsperse 36000 and the like) available from Noveon Inc., and Disperbyk series manufactured by BYK-Chemie, and Disparlon series manufactured by Kusumoto Chemicals, Ltd.

If the ink for forming an entity portion 11' includes a surfactant, it is possible to make the abrasion resistance of the three-dimensional structure 10 more favorable.

The surfactant is not particularly limited, and for example, silicone-based surfactants such as polyester-modified silicone or polyether-modified silicone can be used, and among these, polyether-modified polydimethyl siloxane or polyester-modified polydimethyl siloxane is preferably used.

Specific examples of the surfactant include BYK-347, BYK-348, BYK-UV3500, 3510, 3530, and 3570 (product names, manufactured by BYK Co., Ltd.).

In addition, the ink for forming an entity portion 11' may include a solvent.

Thereby, it is possible to suitably adjust the viscosity of the ink for forming an entity portion 11', and even in a case where the ink for forming an entity portion 11' includes a component having a high viscosity, it is possible to make the discharge stability of the ink for forming an entity portion 11' by an ink jet method excellent.

Examples of the solvent include (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, N-propyl acetate, isopropyl acetate, N-butyl acetate, and isobutyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; and alcohols such as ethanol, propanol, and butanol, and one type or two or more types selected from these can be used singly or in combination.

In addition, the viscosity of the ink for forming an entity portion 11' is preferably 10 mPas to 30 mPas, and more preferably 15 mPas to 25 mPas.

Thereby, it is possible to make the discharge stability of the ink for forming an entity portion 11' by an ink jet method excellent. Moreover, in the present specification, the viscosity refers to a value measured at 25 degrees centigrade by using an E type viscometer (VISCONIC ELD manufactured by Tokyo Keiki Inc.).

In addition, in manufacturing the three-dimensional structure 10, plural types of the ink for forming an entity portion 11' may be used.

For example, an ink (color ink) for forming the entity portion 11' including a colorant and an ink (clear ink) for forming the entity portion 11' not including a colorant may be used.

Thereby, for example, regarding an appearance of the three-dimensional structure 10, it is possible to use the ink for forming an entity portion 11' including a colorant as the ink for forming an entity portion 11' applied to a region that affects the color, and regarding an appearance of the three-dimensional structure 10, it is possible to use the ink for forming an entity portion 11' not including a colorant as the ink for forming an entity portion 11' applied to a region that does not affect the color, and thus, it is advantageous from the viewpoint of reduction in the production cost of the three-dimensional structure 10.

In addition, in the finally obtained three-dimensional structure 10, plural kinds of the ink for forming an entity portion 11' may be used in combination such that a region (coating layer) formed by using the ink for forming an entity portion 11' not including a colorant is provided to the outer surface of a region formed by using the ink for forming an entity portion 11' including a colorant.

Thereby, it is possible to more suitably control the surface shape of the three-dimensional structure 10 (the entity portion 11). In addition, though the entity portion 11 containing a colorant (in particular, a pigment) is likely to be brittle, become scratched, or become chipped compared to the entity portion 11 not containing a colorant, by providing a region (a coating layer) formed by using the ink for forming an entity portion 11' not containing a colorant, it is possible to effectively prevent occurrence of such problems. In addition, even in a case where the surface is worn by using the three-dimensional structure 10 for a long period of time, it is possible to effectively prevent and suppress the color change of the three-dimensional structure 10.

In addition, for example, plural types of the ink for forming an entity portion 11' including colorants having different constitutions may be used.

Thereby, by combination of these inks for forming the entity portion 11', it is possible to widen a color reproduction range that can be represented.

In a case of using plural kinds of the ink for forming an entity portion 11', it is preferable to use at least the ink for forming an entity portion 11' having a cyan color, the ink for forming an entity portion 11' having a magenta color, and the ink for forming an entity portion 11' having a yellow color.

Thus, by combination of these inks for forming the entity portion 11', it is possible to further widen a color reproduction range that can be represented.

In addition, by using the ink for forming an entity portion 11' having a white color and other inks for forming the entity portion 11' having a color in combination, for example, the following effect is obtained.

That is, it is possible to make the finally obtained three-dimensional structure 10 have a region (white region) where the ink for forming an entity portion 11' having a white color is applied and a region (color region) where the ink for forming an entity portion 11' having a color (in particular, a chromatic color) other than white color provided on the outer surface than the region (white region) is applied. Thus, the region (white region) where the ink for forming an entity portion 11' having a white color is applied can exhibit a concealing property, and it is possible to further increase color saturation of the three-dimensional structure 10.

In addition, an effect obtained by controlling the surface shape of the three-dimensional structure 10 (the entity portion 11) as described above and an effect in which color saturation is increased act synergistically, and thus, it is possible to make the aesthetic appearance (aesthetics) of the three-dimensional structure 10 excellent.

(First Ink for Forming Sacrificial Layer)

The first ink for forming a sacrificial layer 12A' includes at least a curable resin (curing component).

(Curable Resin 2)

As the curable resin (curing component) configuring the first ink for forming a sacrificial layer 12A', the same resin as the curable resin (curing component) exemplified as a constituent of the ink for forming an entity portion 11' can be exemplified.

In particular, the curable resin (curing component) configuring the first ink for forming a sacrificial layer 12A' and the curable resin (curing component) configuring the ink for forming an entity portion 11' described above are preferably cured by the same energy ray.

Thereby, it is possible to effectively prevent the configuration of the three-dimensional structure manufacturing apparatus from being complicated, and it is possible to make productivity of the three-dimensional structure 10 excellent. In addition, it is possible to more reliably control the surface shape of the three-dimensional structure 10.

Among various curing components, the first ink for forming a sacrificial layer 12A', in particular, preferably includes one type or two or more types selected from the group consisting of tetrahydrofurfuryl (meth)acrylate, ethoxyethoxyethyl (meth)acrylate, polyethyleneglycol di(meth) acrylate, and (meth)acryloyl morpholine.

Thereby, it is possible to cure the first ink for forming a sacrificial layer 12A' at a more suitable curing rate, it is possible to more reliably form the first region 11A exhibiting an appearance of a matte tone in the three-dimensional structure 10, and it is possible to make productivity of the three-dimensional structure 10 excellent.

In addition, it is possible to make the mechanical strength and stability of the shape of the sacrificial layer 12 (the first region 12A) formed by curing the first ink for forming a sacrificial layer 12A' excellent. As a result, when the three-dimensional structure 10 is manufactured, the sacrificial layer 12 (the first region 12A) which is the lower layer (the first layer) can more suitably support the ink for forming an entity portion 11' for forming the upper layer (second layer). For this reason, it is possible to more suitably prevent unintended deformation (in particular, sagging or the like) of the entity portion 11 (the first region 12A which is the first layer functions as a support material), and it is possible to make the dimensional accuracy of the finally obtained three-dimensional structure 10 excellent.

In particular, in a case where the first ink for forming a sacrificial layer 12A' includes (meth)acryloyl morpholine, the following effects is obtained.

That is, in a state of being not completely cured even in a case where the curing reaction is proceeded (polymer of (meth)acryloyl morpholine in a state of being not completely cured), (meth)acryloyl morpholine has a high solubility with respect to various solvents such as water, is high. Therefore, in the sacrificial layer removing step as described above, it is possible to selectively, reliably, and efficiently remove the sacrificial layer 12 (the first region 12A) while more effectively prevent occurrence of defects in the entity portion 11. As a result, it is possible to obtain the three-dimensional structure 10 having the desired form with high productivity and higher reliability.

In addition, in a case where the first ink for forming a sacrificial layer 12A' includes tetrahydrofurfuryl (meth)acrylate, it is possible to more suitably maintain flexibility after curing, texture formation of a matte tone on the surface of the entity portion 11 can be more effectively done, in a treatment with a liquid for removing the sacrificial layer 12, it is possible to more easily become a gel state, and it is possible to further increase removal efficiency of the sacrificial layer 12.

In addition, in a case where the first ink for forming a sacrificial layer 12A' includes ethoxyethoxyethyl (meth)acrylate, tackiness is likely to remain even after curing, texture formation of a matte tone on the surface of the entity portion 11 can be more effectively done, and in a treatment with a liquid for removing the sacrificial layer 12, it is possible to increase removal efficiency of the sacrificial layer 12.

In addition, in a case where the first ink for forming a sacrificial layer 12A' includes polyethylene glycol di(meth)acrylate, when a liquid for removing the sacrificial layer 12 has a water as a main component, it is possible to more easily remove the sacrificial layer 12 by increasing solubility in the liquid.

In a case where the first ink for forming a sacrificial layer 12A' includes a specific curing component described above (one type or two or more types selected from the group consisting of tetrahydrofurfuryl (meth)acrylate, ethoxyethoxyethyl (meth)acrylate, polyethylene glycol di(meth)acrylate, and (meth)acryloyl morpholine), the proportion of the specific curing component with respect to the entire curing components configuring the first ink for forming a sacrificial layer 12A' is preferably equal to or greater than 80% by mass, more preferably equal to or greater than 90% by mass, and still more preferably 100% by mass. Thereby, effects as described above are more significantly exhibited.

The content of the curing component in the first ink for forming a sacrificial layer 12A' is preferably 83% by mass to 98.5% by mass, and more preferably 87% by mass to 95.4% by mass.

Thereby, it is possible to make stability of the shape of the sacrificial layer 12 (the first region 12A) formed excellent, and in a case where the layer 1 is superposed when the three-dimensional structure 10 is manufactured, it is possible to more effectively prevent the lower side layer 1 from being unintentionally deformed, and it is possible to suitably support the upper side layer 1. As a result, it is possible to make the dimensional accuracy of the finally obtained three-dimensional structure 10 excellent. In addition, it is possible to make productivity of the three-dimensional structure 10 excellent.

(Polymerization Initiator 2)

In addition, the first ink for forming a sacrificial layer 12A' preferably include a polymerization initiator.

Thereby, it is possible to suitably increase the curing rate of the first ink for forming a sacrificial layer 12A' when the three-dimensional structure 10 is manufactured, and it is possible to make productivity of the three-dimensional structure 10 excellent.

In addition, it is possible to make stability of the shape of the sacrificial layer 12 (the first region 12A) formed excellent, and in a case where the layer 1 is superposed when the three-dimensional structure 10 is manufactured, it is possible to more effectively prevent the lower side layer 1 from being unintentionally deformed, and it is possible to suitably support the upper side layer 1. As a result, it is possible to make the dimensional accuracy of the finally obtained three-dimensional structure 10 excellent.

As the polymerization initiator configuring the first ink for forming a sacrificial layer 12A', the same polymerization initiator as the polymerization initiator exemplified as a constituent of the ink for forming an entity portion 11' can be exemplified.

Among these, the first ink for forming a sacrificial layer 12A' preferably includes bis(2,4,6-trimethylbenzoyl)-phenylphosphine oxide, or 2,4,6-trimethylbenzoyl-diphenylphosphine oxide as a polymerization initiator.

Thereby, in a case where such a polymerization initiator is included in the ink, it is possible to cure the first ink for forming a sacrificial layer 12A' at a more suitable curing rate, it is possible to more reliably form a the first region 11A exhibiting an appearance of a matte tone in the three-dimensional structure 10, and it is possible to make productivity of the three-dimensional structure 10 excellent.

In addition, it is possible to make the mechanical strength and stability of the shape of the sacrificial layer 12 (the first region 12A) formed by curing the first ink for forming a sacrificial layer 12A' excellent. As a result, when the three-dimensional structure 10 is manufactured, the sacrificial layer 12 (the first region 12A) which is the lower layer (the first layer) can more suitably support the ink for forming an entity portion 11' for forming the upper layer (the second layer). For this reason, it is possible to more suitably prevent unintended deformation (in particular, sagging or the like) of the entity portion 11 (the first region 12A which is the first layer functions as a support material), and it is possible to make the dimensional accuracy of the finally obtained three-dimensional structure 10 excellent.

In particular, in a case where the first ink for forming a sacrificial layer 12A' includes bis(2,4,6-trimethylbenzoyl)-phenylphosphine oxide as a polymerization initiator together with the ink for forming an entity portion 11', it is possible to more suitably control the curing rate with respect to the ink for forming an entity portion 11' and the first ink for forming a sacrificial layer 12A', and it is possible to more reliably form the first region 11A exhibiting an appearance of a matte tone in the three-dimensional structure 10. In addition, it is possible to make productivity of the three-dimensional structure 10 excellent.

The specific value of the content of the polymerization initiator in the first ink for forming a sacrificial layer 12A' is preferably 1.5% by mass to 17% by mass, and more preferably 4.6% by mass to 13% by mass.

Thereby, it is possible to cure the first ink for forming a sacrificial layer 12A' at a more suitable curing rate, it is possible to more reliably form the first region 11A exhibiting an appearance of a matte tone in the three-dimensional structure 10, and it is possible to make productivity of the three-dimensional structure 10 excellent.

In addition, it is possible to make the mechanical strength and stability of the shape of the sacrificial layer 12 (the first region 12A) formed by curing the first ink for forming a sacrificial layer 12A' excellent. As a result, when the three-dimensional structure 10 is manufactured, the sacrificial layer 12 (the first region 12A) which is the lower layer (the first layer) can more suitably support the ink for forming an entity portion 11' for forming the upper layer (the second layer). For this reason, it is possible to more suitably prevent unintended deformation (in particular, sagging or the like) of the entity portion 11 (the first region 12A which is the first layer functions as a support material), and it is possible to make the dimensional accuracy of the finally obtained three-dimensional structure 10 excellent.

A preferred specific example of the mixing ratio (ink constitution except for "other components" described below) of a curable resin and a polymerization initiator in the first ink for forming a sacrificial layer 12A' is shown below, however, needless to say, the constitution of the first ink for forming a sacrificial layer in the invention is not limited to that described below.

(Mixing Ratio Example 1)
Tetrahydrofurfurylacrylate: 36 parts by mass
Ethoxyethoxyethylacrylate: 55.75 parts by mass
Bis(2,4,6-trimethylbenzoyl)-phenylphosphine oxide: 3 parts by mass
2,4,6-Trimethylbenzoyl-diphenyl-phosphine oxide: 5 parts by mass (Mixing Ratio Example 2)
Dipropylene glycol diacrylate: 37 parts by mass
Polyethylene glycol (400) diacrylate: 55.85 parts by mass
Bis(2,4,6-trimethylbenzoyl)-phenylphosphine oxide: 3 parts by mass
2,4,6-Trimethylbenzoyl-diphenyl-phosphine oxide: 4 parts by mass (Mixing Ratio Example 3)
Tetrahydrofurfurylacrylate: 36 parts by mass
Acryloyl morpholine: 55.75 parts by mass
Bis(2,4,6-trimethylbenzoyl)-phenylphosphine oxide: 3 parts by mass
2,4,6-Trimethylbenzoyl-diphenyl-phosphine oxide: 5 parts by mass In a case of mixing as described above, effects as described above are more significantly exhibited.

(Other Components 2)

In addition, the first ink for forming a sacrificial layer 12A' may include components other than the components described above. Examples of such components include various colorants such as a pigment and a dye; a dispersant; a surfactant; a sensitizer; a polymerization accelerator; a solvent; a penetration enhancer; a wetting agent (humectant); a fixing agent; a fungicide; a preservative; an antioxidant; an ultraviolet absorbent; a chelating agent; a pH adjusting agent; a thickener; a filler; an aggregation preventing agent; and a defoamer.

In particular, in a case where the first ink for forming a sacrificial layer 12A' includes a colorant, the visibility of the sacrificial layer 12 (the first region 12A) is improved, and in the finally obtained three-dimensional structure 10, it is possible to more reliably prevent at least a part of the sacrificial layer 12 (the first region 12A) from unintentionally remaining.

As the colorant configuring the first ink for forming a sacrificial layer 12A', the same colorant as the colorant exemplified as a constituent of the ink for forming an entity portion 11' can be exemplified, and the colorant is preferably a colorant which becomes a color different from the color (color to be seen in appearance of the three-dimensional structure 10) of the entity portion 11 overlapped with the sacrificial layer 12 (the first region 12A) formed by the first ink for forming a sacrificial layer 12A' when observed from the normal direction of the surface of the three-dimensional structure 10. Thereby, effects as described above are more significantly exhibited.

In a case where the first ink for forming a sacrificial layer 12A' includes a pigment, if a dispersant is further included, it is possible to make the dispersibility of the pigment more favorable. As the dispersant configuring the first ink for forming a sacrificial layer 12A', the same dispersant as the dispersant exemplified as a constituent of the ink for forming an entity portion 11' can be exemplified.

In addition, the viscosity of the first ink for forming a sacrificial layer 12A' is preferably 10 mPas to 30 mPas, and more preferably 15 mPas to 25 mPas.

Thereby, it is possible to make the discharge stability of the first ink for forming a sacrificial layer 12A' by an ink jet method excellent.

In addition, in manufacturing the three-dimensional structure 10, plural types of the first ink for forming a sacrificial layer 12A' may be used.

For example, in manufacturing the three-dimensional structure 10, two or more types of the first ink for forming a sacrificial layer 12A' of which viscoelasticities at the time of curing the ink for forming an entity portion 11' are different with each other may be equipped.

Thereby, it is possible to obtain the finally obtained three-dimensional structure 10 which has plural regions (plurality of the first region 12A) where the degrees of a matte tone are different with each other. As a result, it is possible to represent more complex appearance, and it is possible to make an aesthetic appearance (aesthetics), luxurious feeling, or the like of the three-dimensional structure 10 excellent.

Moreover, in order to obtain such effects, for example, it is also conceivable to use two or more types of the ink for forming an entity portion 11' of which viscoelasticities at the time of curing are different with each other, and in such a case, there is a possibility that a problem in which physical properties at each portion of the finally obtained three-dimensional structure 10 are different with intended properties, or the like occurs, and in contrast, in a case of where plural types of the first ink for forming a sacrificial layer 12A' are used, it is possible to obtain the effects as described above while reliably preventing occurrence of such a problem.

(Second Ink for Forming Sacrificial Layer)

A second ink for forming a sacrificial layer 12B' includes at least a curable resin (curing component).

(Curable Resin 3)

As the curable resin (curing component) configuring the second ink for forming a sacrificial layer 12B', the same resin as the curable resin (curing component) exemplified as a constituent of the ink for forming an entity portion 11' can be exemplified.

In particular, the curable resin (curing component) configuring the second ink for forming a sacrificial layer 12B' and the curable resin (curing component) configuring the ink for forming an entity portion 11' described above are preferably cured by the same energy ray.

Thereby, it is possible to effectively prevent the configuration of the three-dimensional structure manufacturing apparatus from being complicated, and it is possible to make productivity of the three-dimensional structure 10 excellent. In addition, it is possible to more reliably control the surface shape of the three-dimensional structure 10.

The second ink for forming a sacrificial layer 12B', among various curable components, in particular, preferably includes 2-(2-vinyloxyethoxy)ethyl (meth)acrylate.

Thereby, it is possible to cure the second ink for forming a sacrificial layer 12B' at a more suitable curing rate, it is possible to more reliably form a the second region 11B exhibiting an appearance of a gloss tone in the three-dimensional structure 10, and it is possible to make productivity of the three-dimensional structure 10 excellent.

In addition, it is possible to make the mechanical strength and stability of the shape of the sacrificial layer 12 (the second region 12B) formed by curing the second ink for forming a sacrificial layer 12B' excellent. As a result, when the three-dimensional structure 10 is manufactured, the sacrificial layer 12 (the second region 12B) which is the lower layer (the first layer) can more suitably support the ink for forming an entity portion 11' for forming the upper layer (the second layer). For this reason, it is possible to more suitably prevent unintended deformation (in particular, sagging or the like) of the entity portion 11 (the second region 12B which is the first layer functions as a support material), and it is possible to make the dimensional accuracy of the finally obtained three-dimensional structure 10 excellent.

In addition, the second ink for forming a sacrificial layer 12B' preferably includes polyethylene glycol di(meth)acrylate in addition to 2-(2-vinyloxyethoxy)ethyl (meth)acrylate.

Thereby, it is possible to cure the second ink for forming a sacrificial layer 12B' at a further suitable curing rate, it is possible to further reliably form the second region 11B exhibiting an appearance of a gloss tone in the three-dimensional structure 10, and it is possible to make productivity of the three-dimensional structure 10 excellent.

In addition, it is possible to make the mechanical strength and stability of the shape of the sacrificial layer 12 (the second region 12B) formed by curing the second ink for forming a sacrificial layer 12B' excellent. As a result, when the three-dimensional structure 10 is manufactured, the sacrificial layer 12 (the second region 12B) which is the lower layer (the first layer) can more suitably support the ink for forming an entity portion 11' for forming the upper layer (the second layer). For this reason, it is possible to further suitably prevent unintended deformation (in particular, sagging or the like) of the entity portion 11 (the second region 12B which is the first layer functions as a support material), and it is possible to make the dimensional accuracy of the finally obtained three-dimensional structure 10 excellent.

In addition, in a case where the second ink for forming a sacrificial layer 12B' includes (meth)acryloyl morpholine, the following effects are obtained.

That is, in a state of being not completely cured even in a case where the curing reaction is proceeded (polymer of (meth)acryloyl morpholine in a state of being not completely cured), (meth)acryloyl morpholine has a high solubility with respect to various solvents such as water, is high. Therefore, in the sacrificial layer removing step as described above, it is possible to selectively, reliably, and efficiently remove the sacrificial layer 12 (the second region 12B) while more effectively prevent occurrence of defects in the entity portion 11. As a result, it is possible to obtain the three-dimensional structure 10 having the desired form with high productivity and higher reliability.

In addition, in a case where the second ink for forming a sacrificial layer 12B' includes one type or two or more types selected from ethoxylated (3) trimethylolpropane triacrylate, tripropylene glycol diacrylate, and dipropylene glycol diacrylate, the viscoelasticity of the sacrificial layer 12 is increased, and texture formation of a gloss tone of the surface of the entity portion 11 is more effectively done.

In a case where the second ink for forming a sacrificial layer 12B' includes 2-(2-vinyloxyethoxy)ethyl (meth)acrylate, the content of 2-(2-vinyloxyethoxy)ethyl (meth)acrylate in the ink for forming a sacrificial layer 12' is preferably 20% by mass to 50% by mass, more preferably 25% by mass to 45% by mass, and still more preferably 30% by mass to 40% by mass. Thereby, effects as described above are more significantly exhibited.

In a case where the second ink for forming a sacrificial layer 12B' includes polyethylene glycol di(meth)acrylate, the content of polyethylene glycol di(meth)acrylate in the ink for forming a sacrificial layer 12' is preferably 40% by mass to 70% by mass, more preferably 35% by mass to 65% by mass, and still more preferably 30% by mass to 60% by mass. Thereby, effects as described above are more significantly exhibited.

The proportion ((XB/XA)×100) of the content XB [% by mass] of polyethylene glycol di(meth)acrylate to the content XA [% by mass] of 2-(2-vinyloxyethoxy)ethyl (meth)acrylate in the second ink for forming a sacrificial layer 12B' is preferably 120% to 180%, more preferably 130% to 170%, and still more preferably 140% to 165%. Thereby, effects as described above are more significantly exhibited.

The content of the curing component in the second ink for forming a sacrificial layer 12B' is preferably 83% by mass to 98.5% by mass, and more preferably 87% by mass to 95.4% by mass.

Thereby, it is possible to make stability of the shape of the sacrificial layer 12 (the second region 12B) formed excellent, and in a case where the layer 1 is superposed when the three-dimensional structure 10 is manufactured, it is possible to more effectively prevent the lower side layer 1 from being unintentionally deformed, and it is possible to suitably support the upper side layer 1. As a result, it is possible to make the dimensional accuracy of the finally obtained three-dimensional structure 10 excellent. In addition, it is possible to make productivity of the three-dimensional structure 10 excellent.

(Polymerization Initiator 3)

In addition, the second ink for forming a sacrificial layer 12B' preferably include a polymerization initiator.

Thereby, it is possible to suitably increase the curing rate of the second ink for forming a sacrificial layer 12B' when the three-dimensional structure 10 is manufactured, and it is possible to make productivity of the three-dimensional structure 10 excellent.

In addition, it is possible to make stability of the shape of the sacrificial layer 12 (the second region 12B) formed excellent, and in a case where the layer 1 is superposed when the three-dimensional structure 10 is manufactured, it is possible to more effectively prevent the lower side layer 1 from being unintentionally deformed, and it is possible to suitably support the upper side layer 1. As a result, it is possible to make the dimensional accuracy of the finally obtained three-dimensional structure 10 excellent.

As the polymerization initiator configuring the second ink for forming a sacrificial layer 12B', the same polymerization initiator as the polymerization initiator exemplified as a constituent of the ink for forming an entity portion 11' can be exemplified.

Among these, the first ink for forming a sacrificial layer 12A' preferably includes bis(2,4,6-trimethylbenzoyl)-phenylphosphine oxide, or 2,4,6-trimethylbenzoyl-diphenyl-phosphine oxide as a polymerization initiator.

Thereby, in a case where such a polymerization initiator is included in the ink, it is possible to cure the second ink for forming a sacrificial layer 12B' at a more suitable curing rate, it is possible to more reliably form a the second region 11B exhibiting an appearance of a gloss tone in the three-dimensional structure 10, and it is possible to make productivity of the three-dimensional structure 10 excellent.

In addition, it is possible to make the mechanical strength and stability of the shape of the sacrificial layer 12 (the second region 12B) formed by curing the second ink for forming a sacrificial layer 12B' excellent. As a result, when the three-dimensional structure 10 is manufactured, the sacrificial layer 12 (the second region 12B) which is the lower layer (the first layer) can more suitably support the ink for forming an entity portion 11' for forming the upper layer (the second layer). For this reason, it is possible to more suitably prevent unintended deformation (in particular, sagging or the like) of the entity portion 11 (the second region 12B which is the first layer functions as a support material), and it is possible to make the dimensional accuracy of the finally obtained three-dimensional structure 10 excellent.

The specific value of the content of the polymerization initiator in the second ink for forming a sacrificial layer 12B' is preferably 1.5% by mass to 17% by mass, and more preferably 4.6% by mass to 13% by mass.

Thereby, it is possible to cure the second ink for forming a sacrificial layer 12B' at a more suitable curing rate, it is possible to more reliably form a the second region 11B exhibiting an appearance of a gloss tone in the three-dimensional structure 10, and it is possible to make productivity of the three-dimensional structure 10 excellent.

In addition, it is possible to make the mechanical strength and stability of the shape of the sacrificial layer 12 (the second region 12B) formed by curing the second ink for forming a sacrificial layer 12B' excellent. As a result, when the three-dimensional structure 10 is manufactured, the sacrificial layer 12 (the second region 12B) which is the lower layer (the first layer) can more suitably support the ink for forming an entity portion 11' for forming the upper layer (the second layer). For this reason, it is possible to more suitably prevent unintended deformation (in particular, sagging or the like) of the entity portion 11 (the second region 12B which is the first layer functions as a support material), and it is possible to make the dimensional accuracy of the finally obtained three-dimensional structure 10 excellent.

A preferred specific example of the mixing ratio (ink constitution except for "other components" described below) of a curable resin and a polymerization initiator in the second ink for forming a sacrificial layer 12B' is shown below, however, needless to say, the constitution of the second ink for forming a sacrificial layer in the invention is not limited to that described below.

(Mixing Ratio Example 1)
2-(2-Vinyloxyethoxy)ethyl acrylate: 36 parts by mass
Polyethylene glycol (400) diacrylate: 55.75 parts by mass
Bis(2,4,6-trimethylbenzoyl)-phenylphosphine oxide: 3 parts by mass
2,4,6-Trimethylbenzoyl-diphenyl-phosphine oxide: 5 parts by mass In a case of mixing as described above, effects as described above are more significantly exhibited.

In addition, in a case where the content of the polymerization initiator in the second ink for forming a sacrificial layer is greater than the content of the polymerization initiator in the first ink for forming a sacrificial layer, it is possible to form a region having an appearance of a gloss tone at more suitable curing rate, it is possible to form a region having an appearance of a matte tone in the first ink for forming a sacrificial layer, and it is possible to produce a three-dimensional structure exhibiting a desired appearance.

(Other Components 3)

In addition, the second ink for forming a sacrificial layer 12B' may include components other than the components described above. Examples of such components include various colorants such as a pigment and a dye; a dispersant; a surfactant; a sensitizer; a polymerization accelerator; a solvent; a penetration enhancer; a wetting agent (humectant); a fixing agent; a fungicide; a preservative; an antioxidant; an ultraviolet absorbent; a chelating agent; a pH adjusting agent; a thickener; a filler; an aggregation preventing agent; and a defoamer.

In particular, in a case where the second ink for forming a sacrificial layer 12B' includes a colorant, the visibility of the sacrificial layer 12 (the second region 12B) is improved, and in the finally obtained three-dimensional structure 10, it is possible to more reliably prevent at least a part of the sacrificial layer 12 (the second region 12B) from unintentionally remaining.

As the colorant configuring the second ink for forming a sacrificial layer 12B', the same colorant as the colorant exemplified as a constituent of the ink for forming an entity portion 11' can be exemplified, and the colorant is preferably a colorant which becomes a color different from the color (color to be seen in an appearance of the three-dimensional structure 10) of the entity portion 11 overlapped with the sacrificial layer 12 (the second region 12B) formed by the second ink for forming a sacrificial layer 12B' when observed from the normal direction of the surface of the three-dimensional structure 10. Thereby, effects as described above are more significantly exhibited.

In a case where the second ink for forming a sacrificial layer 12B' includes a pigment, if a dispersant is further included, it is possible to make the dispersibility of the pigment more favorable. As the dispersant configuring the second ink for forming a sacrificial layer 12B', the same dispersant as the dispersant exemplified as a constituent of the ink for forming an entity portion 11' can be exemplified.

In addition, the viscosity of the second ink for forming a sacrificial layer 12B' is preferably 10 mPas to 30 mPas, and more preferably 15 mPas to 25 mPas.

Thereby, it is possible to make the discharge stability of the second ink for forming a sacrificial layer 12B' by an ink jet method excellent.

In addition, in manufacturing the three-dimensional structure 10, plural types of the second ink for forming a sacrificial layer 12B' may be used.

For example, in manufacturing the three-dimensional structure 10, two or more types of the second ink for forming a sacrificial layer 12B' of which viscoelasticities at the time of curing the ink for forming an entity portion 11' are different with each other may be equipped.

Thereby, it is possible to obtain the finally obtained three-dimensional structure 10 which has plural regions (plurality of the second region 12B) where the degrees of a gloss tone are different with each other. As a result, it is possible to represent more complex appearance, and it is possible to make an aesthetic appearance (aesthetics), luxurious feeling, or the like of the three-dimensional structure 10 excellent.

Moreover, in order to obtain such effects, for example, it is also conceivable to use two or more types of the ink for forming an entity portion 11' of which viscoelasticities at the time of curing are different with each other, and in such a case, there is a possibility that a problem in which physical properties at each portion of the finally obtained three-dimensional structure 10 are different with intended properties, or the like occurs, and in contrast, in a case where plural types of the second ink for forming a sacrificial layer 12B' are used, it is possible to obtain the effects as described above while reliably preventing occurrence of such a problem.

In addition, the ink set of the invention may be an ink set which is equipped with at least one of the ink for forming an entity portion 11', at least one of the first ink for forming a sacrificial layer 12A', and at least one of the second ink for forming a sacrificial layer 12B', and may be equipped with an ink (the fourth ink) different from these inks.

Moreover, the ink set of the invention may be an apparatus which is used in manufacturing a three-dimensional structure having a region of a matte tone and a region of a gloss tone, and for example, it is also possible to use in manufacturing a plurality of a three-dimensional structure having different surface states. More specifically, for example, the ink set of the invention may be an apparatus which is used in manufacturing a three-dimensional structure which has a region of a matte tone and does not have a region of a gloss tone and a three-dimensional structure which has a region of a gloss tone and does not have a region of a matte tone.

According to the above-described ink set of the invention, it is possible to stably and efficiently manufacture a three-dimensional structure in which a region having an appearance of a matte tone and a region having an appearance of a gloss tone are provided at a desired portion. In addition, the three-dimensional structure manufacturing apparatus can be used in suitably forming a three-dimensional structure having an appearance of a matte tone and a three-dimensional structure having an appearance of a gloss tone separately. Since the yield of the three-dimensional structure can be improved, the invention is also advantageous from the viewpoint of reducing the manufacturing cost of a three-dimensional structure.

(Three-dimensional Structure)

The three-dimensional structure of the invention can be manufactured by using the manufacturing method as described above, the three-dimensional structure manufacturing apparatus, and an ink set. Thereby, it is possible to provide a three-dimensional structure in which a region having an appearance of a matte tone and a region having an appearance of a gloss tone are provided at a desired portion.

Use of the three-dimensional structure of the invention is not limited, and items for appreciation and articles on exhibition such as a doll and a figure; a medical device such as an implant can be exemplified.

In addition, the three-dimensional structure of the invention may be applied to any of a prototype, mass-produced products, and order made products.

In addition, the three-dimensional structure of the invention may be a model (for example, models of vehicles such as an automobile, a motorcycle, a ship, and an airplane, buildings, organisms such as an animal and a plant, natural objects (non-organism) such as a stone, and various foods).

In the model, it is preferable to faithfully express a texture or the like which an original object has, however, in the three-dimensional structure manufactured using a stacking method in the related art, it is not possible to sufficiently satisfy the above requirements. In contrast, in the invention, it is possible to separately forming a matte tone and a gloss tone which are particularly difficult to be formed in the related art. In addition, an object (original object) to become a model is equipped with both a region of a matte tone and a region of a gloss tone in many cases (for example, an automobile to become a model generally has a tire portion exhibiting an appearance of a matte tone and a body portion exhibiting an appearance of a gloss tone), and in the related art, it is very difficult to provide a three-dimensional structure as a model having a plurality of regions having different texture from each other, however, in the invention, it is possible to suitably provide even such a three-dimensional structure. Therefore, in a case where the invention is applied to a model, effects of the invention are more significantly exhibited.

Hereinabove, the preferred embodiments of the invention have been described, but the invention is not limited to these embodiments.

For example, in the embodiment described above, description has been made focused on a case where the ink for forming an entity portion, the first ink for forming a sacrificial layer, or the second ink for forming a sacrificial layer is discharged by an ink jet method, however, at least one of these inks may be applied by other methods (for example, other printing methods).

In addition, in the manufacturing method of the invention, a pretreatment step, an intermediate treatment step, or a post-treatment step may be performed, as necessary.

As the pretreatment step, a cleaning step of the stage or the like can be exemplified.

As the post-treatment step, a cleaning step, a shape adjusting step of performing deburring or the like, and an additional curing treatment for increasing the degree of cure of a curable resin configuring the entity portion can be exemplified.

In addition, the post-treatment step, for example, may have a step of performing a surface roughening treatment for increasing a matte tone of a three-dimensional structure. As described above, in the invention, when the ink for forming an entity portion and the first ink for forming a sacrificial layer satisfy a predetermined relationship for viscoelasticity, it is possible to make a matte property of the surface increased, and thus, even in a case of performing such a post-treatment, it is possible to easily perform the post-treatment in a short period of time, and thus, it is possible to make productivity of a three-dimensional structure excellent. In addition, an effect obtained when the ink for forming an entity portion and the first ink for forming a sacrificial layer satisfy a predetermined relationship for viscoelasticity and an effect obtained by performing the post-treatment step act synergistically, and thus, it is possible to obtain an appearance of an excellent matte tone that cannot be achieved in the related art even though the post-treatment step is performed.

In addition, the post-treatment step, for example, may have a step of performing a surface minoring treatment (polishing treatment) for increasing a mirror property (gloss property) of a three-dimensional structure. As described above, in the invention, when the ink for forming an entity portion and the second ink for forming a sacrificial layer satisfy a predetermined relationship for viscoelasticity, it is possible to make flatness of the surface increased, and thus, even in a case of performing such a post-treatment, it is possible to easily perform the post-treatment in a short period of time, and thus, it is possible to make productivity of a three-dimensional structure excellent. In addition, an effect obtained when the ink for forming an entity portion and the second ink for forming a sacrificial layer satisfy a predetermined relationship for viscoelasticity and an effect obtained by performing the post-treatment step act synergistically, and thus, it is possible to obtain an appearance of an excellent minor property that cannot be achieved in the related art even though the post-treatment step is performed.

In addition, the invention may be applied to a powder stacking method (that is, a method for obtaining a three-dimensional structure in which a layer is formed by using a powder, a series of operations of forming a curing portion by applying a curable ink to a predetermined portion of the layer is repeatedly performed, and as a result, a laminate having plural layers in which the curing portion is provided).

REFERENCE SIGNS LIST

10 . . . Three-dimensional structure
10' . . . Temporarily formed body
1 . . . Layer
11' Ink for forming an entity portion
11 . . . Entity portion
11A . . . First region
11B . . . Second region
12' Ink for forming a sacrificial layer
12A' . . . First ink for forming a sacrificial layer
12B' . . . Second ink for forming a sacrificial layer
12 . . . Sacrificial layer
12A . . . First region
12B . . . Second region
100 . . . Three-dimensional structure manufacturing apparatus
2 . . . Control portion
21 . . . Computer
22 . . . Driving control portion
3 . . . Stage
4 . . . Entity portion forming ink discharge portion (entity portion forming ink applying means)
5 . . . Sacrificial layer forming ink discharge portion (sacrificial layer forming ink applying means)
5A . . . First sacrificial layer forming ink discharge portion (first sacrificial layer forming ink applying means)
5B . . . Second sacrificial layer forming ink discharge portion (second sacrificial layer forming ink applying means)
6 . . . Energy ray irradiation means (curing means)

The invention claimed is:

1. A method for manufacturing a three-dimensional structure by stacking layers formed by discharging an ink including a curable resin and curing the layers,
wherein an ink for forming an entity portion is applied to a region where the three-dimensional structure is configured, and an ink for forming a sacrificial layer for forming a sacrificial layer is applied to a region on a surface side of an outermost layer which is adjacent to a region to become the outermost layer of the three-dimensional structure,
wherein a first ink for forming a sacrificial layer and a second ink for forming a sacrificial layer are used as the ink for forming a sacrificial layer,
wherein the viscoelasticity of the first ink for forming a sacrificial layer at the time of curing the ink for forming an entity portion is smaller than the viscoelasticity of the ink for forming an entity portion at the time of curing the ink for forming an entity portion, and
wherein the viscoelasticity of the second ink for forming a sacrificial layer at the time of curing the ink for forming an entity portion is greater than the viscoelasticity of the ink for forming an entity portion at the time of curing the ink for forming an entity portion.

2. The method for manufacturing a three-dimensional structure according to claim 1, comprising:
a step of removing a sacrificial layer from a temporarily formed body obtained by curing the ink for forming an entity portion, the first ink for forming a sacrificial layer, and the second ink for forming a sacrificial layer.

3. The method for manufacturing a three-dimensional structure according to claim 1,
wherein the first ink for forming a sacrificial layer includes one type or two or more types selected from the group consisting of tetrahydrofurfuryl (meth)acrylate, ethoxyethoxyethyl (meth)acrylate, polyethylene glycol di(meth)acrylate, and (meth)acryloyl morpholine.

4. The method for manufacturing a three-dimensional structure according to any one of claims 1,
wherein the second ink for forming a sacrificial layer includes 2-(2-vinyloxyethoxy)ethyl (meth)acrylate.

5. The method for manufacturing a three-dimensional structure according to claim 4,
wherein the second ink for forming a sacrificial layer includes polyethylene glycol di(meth)acrylate in addition to 2-(2-vinyloxyethoxy)ethyl (meth)acrylate.

6. The method for manufacturing a three-dimensional structure according to any one of claims 1,
wherein the ink for forming an entity portion includes one type or two or more types selected from the group consisting of 2-(2-vinyloxyethoxy)ethyl (meth)acrylate, polyether-based aliphatic urethane (meth)acrylate oligomer, 2-hydroxy-3-phenoxypropyl (meth)acrylate, and 4-hydroxybutyl (meth)acrylate.

7. The method for manufacturing a three-dimensional structure according to any one of claims 1,
wherein all of the ink for forming an entity portion, the first ink for forming a sacrificial layer, and the second ink for forming a sacrificial layer include a polymerization initiator, and
wherein the content of the polymerization initiator in the ink for forming an entity portion is greater than the content of the polymerization initiator in the first ink for forming a sacrificial layer and the content of the polymerization initiator in the second ink for forming a sacrificial layer.

8. The method for manufacturing a three-dimensional structure according to any one of claims 1,
wherein all of the ink for forming an entity portion, the first ink for forming a sacrificial layer, and the second ink for forming a sacrificial layer include bis(2,4,6-trimethylbenzoyl)-phenylphosphine oxide and/or 2,4,6-trimethylbenzoyl-diphenyl-phosphine oxide as the polymerization initiator.

9. The method for manufacturing a three-dimensional structure according to any one of claims 1,
wherein as the ink for forming an entity portion, in addition to a coloring ink containing a colorant, a colorless ink not containing a coloring agent is used, and
wherein the colorless ink is used for forming a region to become the outermost surface, and the coloring ink is used for forming a region on the inner side than the region.

10. The method for manufacturing a three-dimensional structure according to any one of claims 1,
wherein the chromatic color ink and the white ink are used as the coloring ink containing a colorant, and wherein the white ink is used for forming a region on the inner side of a region formed by using the chromatic color ink.

11. The method for manufacturing a three-dimensional structure according to any one of claims 1,
wherein different plural types of the first ink for forming a sacrificial layer are used.

12. The method for manufacturing a three-dimensional structure according to any one of claims 1,
wherein different plural types of the second ink for forming a sacrificial layer are used.

* * * * *